US012810790B2

(12) United States Patent
Kim et al.

(10) Patent No.: US 12,810,790 B2
(45) Date of Patent: Nov. 24, 2026

(54) GATE DRIVER AND DISPLAY DEVICE INCLUDING THE SAME

(71) Applicant: LG Display Co., Ltd., Seoul (KR)

(72) Inventors: Kwang Soo Kim, Paju-si (KR); Tae Gwan Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/932,303

(22) Filed: Oct. 30, 2024

(65) Prior Publication Data

US 2025/0239218 A1 Jul. 24, 2025

(30) Foreign Application Priority Data

Jan. 24, 2024 (KR) ........................ 10-2024-0011090

(51) Int. Cl.
*G09G 3/32* (2016.01)
*G09G 3/3225* (2016.01)

(52) U.S. Cl.
CPC ... *G09G 3/3225* (2013.01); *G09G 2310/0286* (2013.01); *G09G 2310/0289* (2013.01); *G09G 2310/08* (2013.01)

(58) Field of Classification Search
CPC ......... G09G 3/3225; G09G 2310/0286; G09G 2310/0289; G09G 2310/08; G09G 3/3266; G09G 3/3275; G09G 3/36; G09G 3/32
See application file for complete search history.

(56) References Cited

U.S. PATENT DOCUMENTS

| | | | | |
|---|---|---|---|---|
| 2019/0197964 | A1* | 6/2019 | Cho | G09G 3/20 |
| 2020/0258463 | A1* | 8/2020 | Kim | G09G 3/3677 |
| 2022/0189407 | A1* | 6/2022 | Choi | G09G 3/3258 |
| 2022/0208111 | A1* | 6/2022 | Baek | G09G 3/3266 |

* cited by examiner

*Primary Examiner* — Michael A Faragalla
(74) *Attorney, Agent, or Firm* — Birch, Stewart, Kolasch & Birch, LLP

(57) ABSTRACT

A gate driver can include a level shifter configured to output first-mode gate clocks in a normal scan rate mode and output second-mode gate clocks in a high scan rate mode, and a gate shift register configured to output normal scan rate scan signals synchronized with the first-mode gate clocks in the normal scan rate mode and output high scan rate scan signals synchronized with the second-mode gate clocks in the high scan rate mode. Adjacent gate clocks of the first-mode gate clocks have a phase difference equal to 1 horizontal period, and adjacent gate clock pairs of the second-mode gate clocks have a phase difference equal to 1 horizontal period and two gate clocks configuring the same gate clock pair are synchronized with each other. The first-mode gate clocks are implemented as a 16-phase clock and the second-mode gate clocks are implemented as a 16-phase clock.

12 Claims, 23 Drawing Sheets

[ MODE1 ]

[ MODE 2 ]

[ MODE2 ]

GATE DRIVER AND DISPLAY DEVICE INCLUDING THE SAME

CROSS-REFERENCE TO RELATED APPLICATIONS

This application claims priority to Korean Patent Application No. 10-2024-0011090 filed in the Republic of Korea on Jan. 24, 2024, the entire contents of which is hereby expressly incorporated by reference into the present application.

BACKGROUND

Field

The present disclosure relates to a gate driver and a display device including the same.

Discussion of the Related Art

Display device includes a gate driver for driving the gate lines of a display panel.

Recently, a gate driver is designed to selectively implement a normal scan rate mode and a high scan rate mode. The gate driver can supply gate lines with a scan signal shifted by units of one line so as to implement a normal scan rate and can supply the gate lines with a scan signal shifted by units of two lines so as to implement a high scan rate.

However, the gate driver which implements all of the normal scan rate mode and the high scan rate mode can have a limitation where a mount area can increase compared to a gate driver which implements only the normal scan rate mode.

SUMMARY OF THE DISCLOSURE

To overcome the aforementioned limitations and other issues of the related art, the present disclosure can provide a gate driver and a display device including the same, which can implement all of a normal scan rate mode and a high scan rate mode without an increase in a mount area.

To achieve these objects and other advantages and in accordance with the purpose of the disclosure, as embodied and broadly described herein, a gate driver according to an aspect of the present disclosure includes a level shifter configured to output first-mode gate clocks in a normal scan rate mode and output second-mode gate clocks in a high scan rate mode and a gate shift register configured to output normal scan rate scan signals synchronized with the first-mode gate clocks in the normal scan rate mode and output high scan rate scan signals synchronized with the second-mode gate clocks in the high scan rate mode, wherein adjacent gate clocks of the first-mode gate clocks have a phase difference equal to 1 horizontal period, adjacent gate clock pairs of the second-mode gate clocks have a phase difference equal to 1 horizontal period and two gate clocks configuring the same gate clock pair are synchronized with each other, and the first-mode gate clocks are implemented as a 16-phase clock and the second-mode gate clocks are implemented as a 16-phase clock.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Hereinafter, the present disclosure will be described more fully with reference to the accompanying drawings, in which example embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. Further, the term "can" fully encompasses all the meanings and coverages of the term "may."

A display device according to the present disclosure can be applied to televisions (TVs), video players, personal computers (PCs), home theaters, electronic devices for vehicles, and smartphones, but is not limited thereto. The display device according to the present disclosure can be implemented as a light emitting display device, a quantum dot display (QDD) apparatus, or a liquid crystal display (LCD) apparatus. Hereinafter, for convenience of description, a light emitting display device based on an inorganic light emitting diode or an organic light emitting diode will be described for example.

Moreover, an example where a light emitting display device described below includes an n-type or p-type transistor will be described, but the light emitting display device can be implemented as a type where an n-type transistor and a p-type transistor are provided in common. A transistor can be a three-electrode element including a gate, a source, and a drain. A source and a drain of a transistor can be switched based on an applied voltage. Based thereon, in the following description, an example will be described where one of a source and a drain is a first electrode, and the other of the source and the drain is a second electrode.

All the components of each display device according to all embodiments of the present disclosure are operatively coupled and configured.

Figure 1:
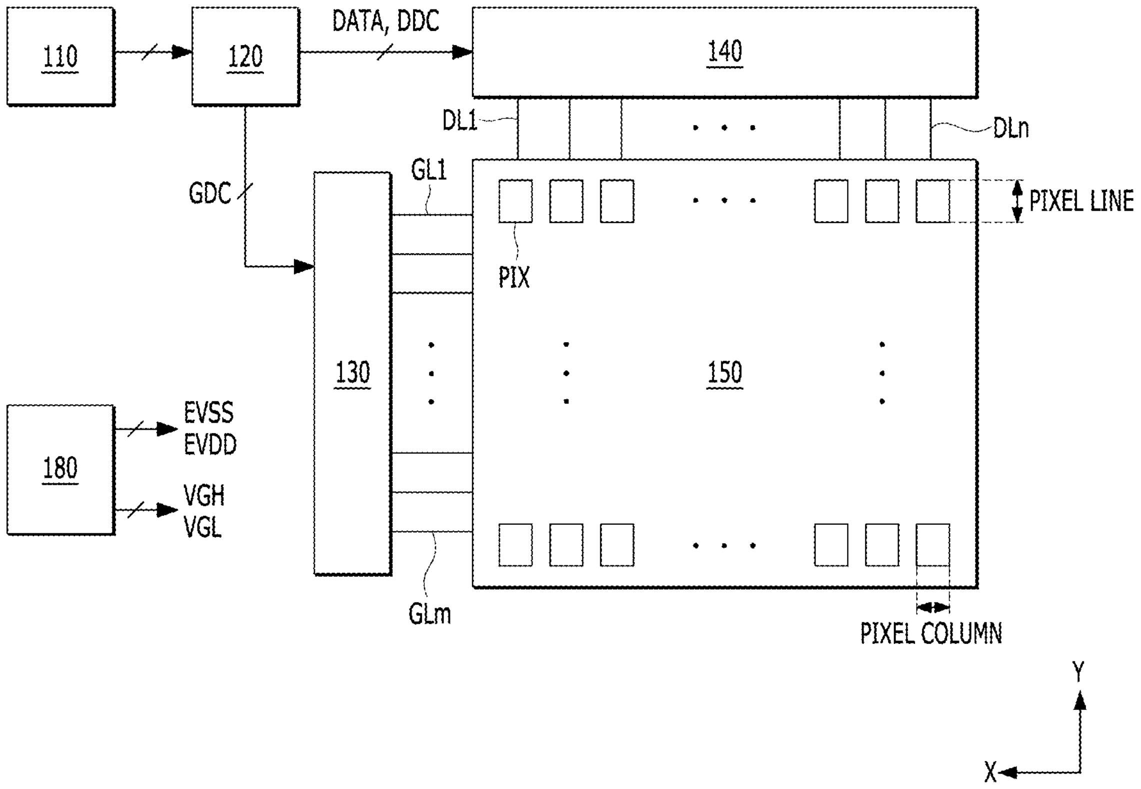
FIG. 1 is a diagram illustrating a display device according to an embodiment of the present disclosure.
Figure 2:
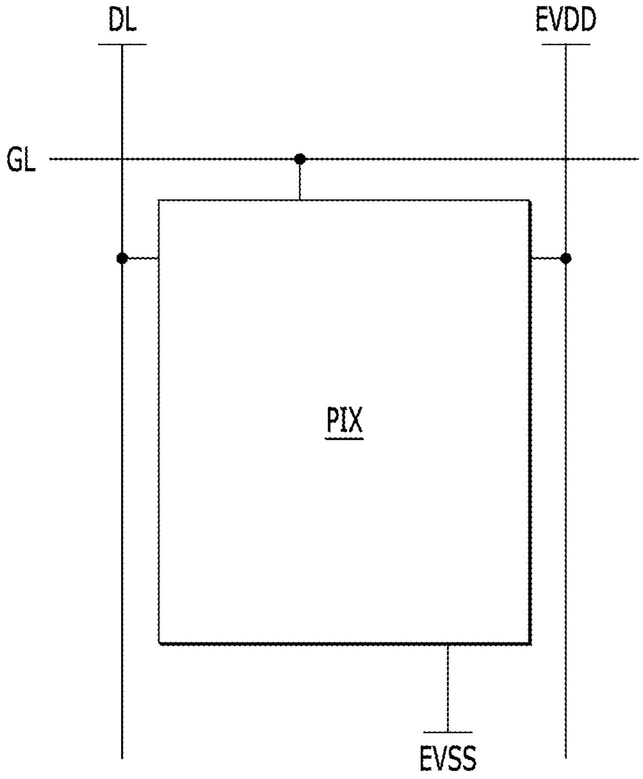
FIG. 2 is a diagram schematically illustrating a pixel illustrated in FIG. 1.

FIG. 1 is a diagram illustrating a display device according to the present embodiment of the present disclosure. FIG. 2 is a diagram schematically illustrating a pixel illustrated in FIG. 1.

As illustrated in FIGS. 1 and 2, the display device according to the present embodiment can include a host system 110, a timing controller 120, a gate driver 130, a data driver 140, a display panel 150, and a power circuit 180. Based on an implementation type of a display device, one or more of the timing controller 120, the gate driver 130, and the data driver 140 can be integrated into a single integrated circuit (IC).

The host system 110 can supply the timing controller 120 with a synchronization timing signal along with video data. The host system 110 be one of a television (TV), a set-top box, a navigation system, a personal computer (PC), a home theater, an automotive display system, a mobile device, and a wearable device.

The timing controller 120 can output a gate timing control signal GDC for controlling an operation timing of the gate driver 130 and a data timing control signal DDC for controlling an operation timing of the data driver 140, based on the synchronization timing signal. The timing controller 120 can supply the data driver 140 with image data DATA along with the data timing control signal DDC. The timing controller 120 can be formed as an IC type and can be mounted on a printed circuit board (PCB), but is not limited thereto.

The gate driver 130 can output a scan signal, based on the gate timing control signal GDC supplied from the timing controller 120. The gate driver 130 can supply the scan signal to pixels PIX of the display panel 150 through a plurality of gate lines GL1 to GLm, where m is a real number. The gate driver 130 can be formed as an IC type, or can be directly formed as a gate in panel (GIP) type on the display panel 150, but is not limited thereto.

The data driver 140 can sample and latch the image data DATA, based on the data timing control signal DDC supplied from the timing controller 120, and can map latched data to a gamma compensation voltage to generate analog data voltages. The data driver 140 can supply the data voltages to the pixels PIX of the display panel 150 through a plurality of data lines DL1 to DLn, where n is a real number. The data driver 140 can be formed as an IC type and can be bonded to or mounted on a PCB, but is not limited thereto.

The power circuit 180 can generate a high-level first panel power EVDD and a low-level second panel power EVSS, based on a direct current (DC) input voltage supplied from the outside. The power circuit 180 can further generate a gate high voltage VGH and a gate low voltage VGL each needed for driving of the gate driver 130 and a source voltage needed for driving of the data driver 140.

The display panel 150 can include a screen which displays an input image. The screen can be configured with a pixel array. The pixel array can include the plurality of data lines DL1 to DLn, the plurality of gate lines GL1 to GLm intersecting with the data lines DL1 to DLn, and a plurality of pixels PIX.

The pixels PIX can be arranged on the screen AA as a matrix type defined by the data lines DL1 to DLn and the gate lines GL1 to GLm. The pixels PIX can be arranged as various types, such as a stripe type and a diamond type as well as a matrix type, on the screen.

The pixel array can include a plurality of pixel columns and a plurality of pixel lines intersecting with the pixel columns. Each of the pixel columns can include pixels PIX which are arranged in a Y-axis direction. A pixel line can include pixels PIX which are arranged in an X-axis direction. One vertical period can be one frame time needed for writing image data DATA of one frame in all pixels PIX of the screen. 1 horizontal period can be a time obtained by dividing one frame period by the number of pixel lines L1 to Ln. 1 horizontal period can be a time needed for writing the image data DATA of one pixel line, sharing a gate line, in pixels PIX of one pixel line.

The pixels PIX can include a red (R) pixel, a green (G) pixel, a blue (B) pixel, and a white (W) pixel for color implementation. Each of the pixels PIX can include a pixel circuit which includes a light emitting device, a driving element, a switching element, and a capacitor. Each of the driving element and the switching element can be implemented as a thin film transistor (TFT). TFTs can be implemented as a P type, an N type, or a hybrid type where the P type and the N type are provided in common. Further, a semiconductor layer of each TFT can include amorphous silicon, polysilicon, or oxide.

Figure 3:
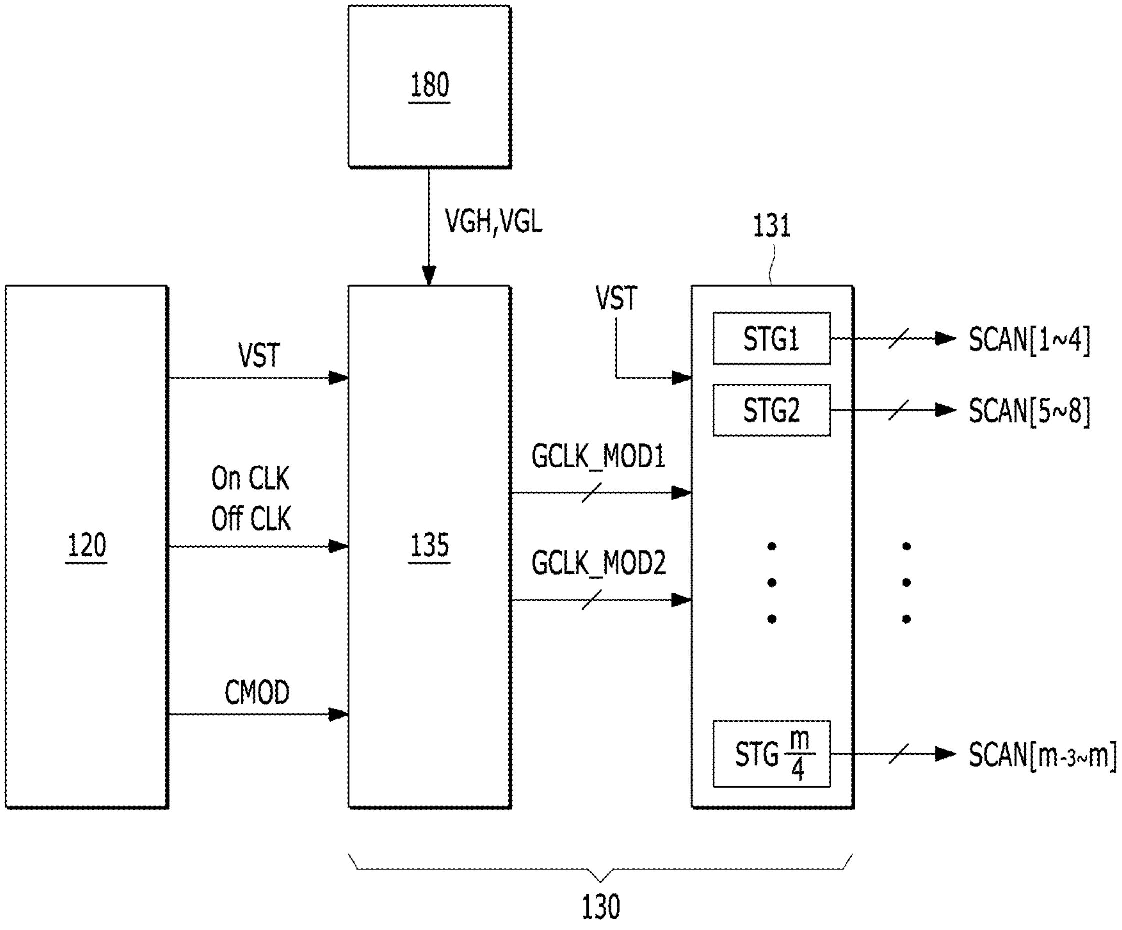
FIG. 3 is a diagram illustrating a connection configuration between a timing controller and a gate driver in the display device according to the present embodiment of the present disclosure.
Figure 4:
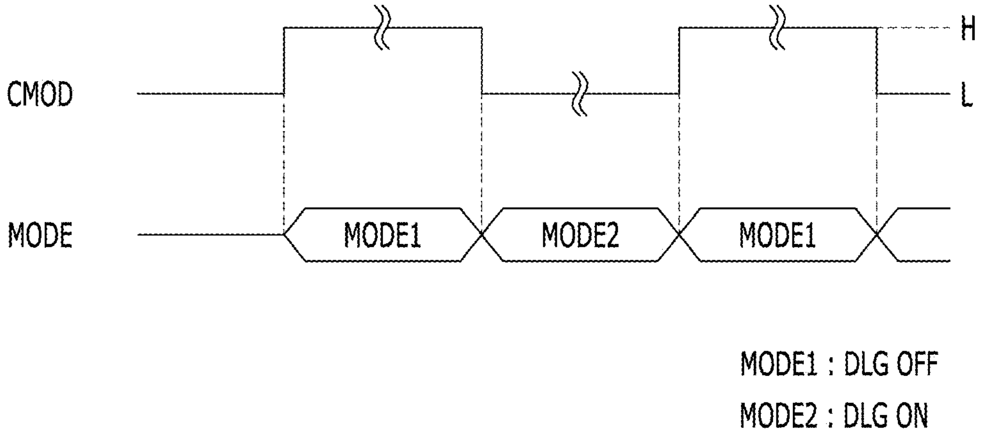
FIG. 4 is a diagram illustrating an example where a normal scan rate mode and a high scan rate mode are selectively executed based on a mode control signal.
Figure 5:
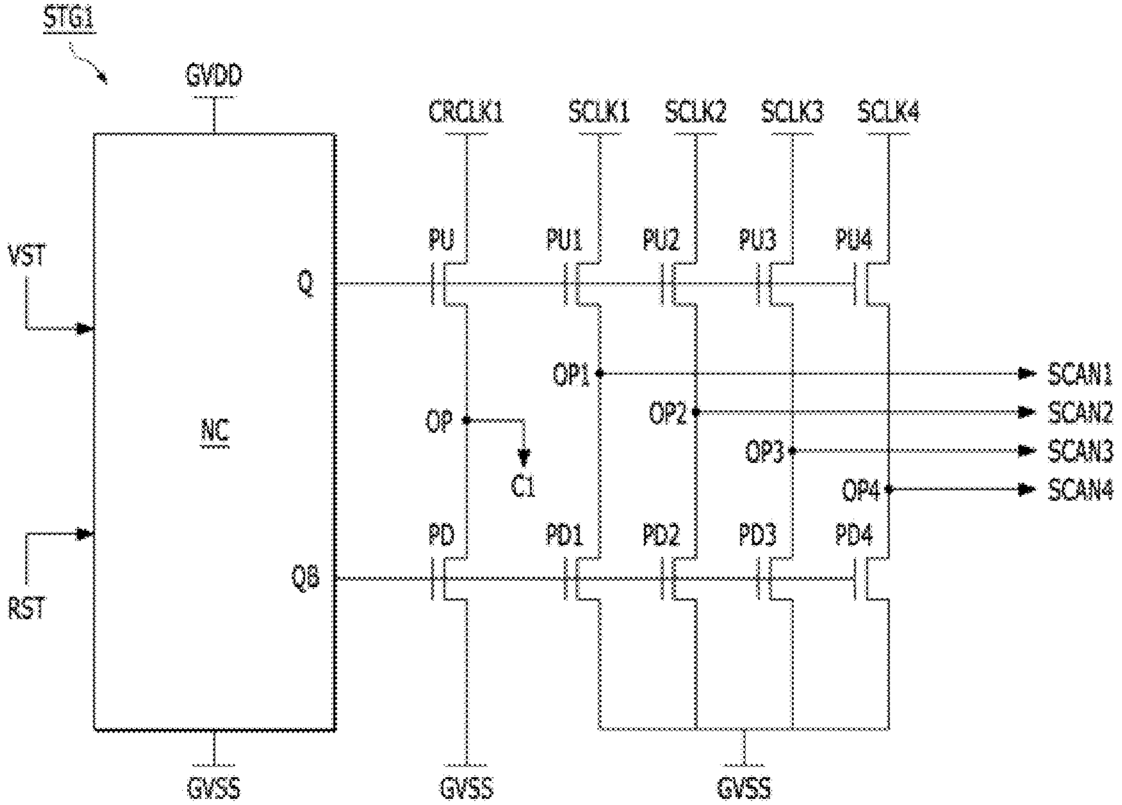
FIG. 5 is a diagram schematically illustrating a configuration of one stage included in a gate shift register.

FIG. 3 is a diagram illustrating a connection configuration between a timing controller and a gate driver in the display device according to the present embodiment. FIG. 4 is a diagram illustrating an example where a normal scan rate mode and a high scan rate mode are selectively executed based on a mode control signal. FIG. 5 is a diagram schematically illustrating a configuration of one stage included in a gate shift register.

Referring to FIG. 3, a gate driver 130 can include a level shifter 135 and a gate shift register 131.

The level shifter 135 can generate gate clocks GCLK, based on a gate timing control signal GDC (i.e., a start signal VST, an on clock (On CLK), and an off clock (Off CLK)) input from a timing controller 120 and a gate high voltage VGH and a gate low voltage VGL each input from a power circuit 180.

The level shifter 135, as illustrated in FIG. 4, can generate first-mode and second-mode gate clocks GCLK_MOD1 and GCLK_MOD2 for implementing a scan rate mode based on a mode control signal CMOD input from the timing controller 120 to output to the gate shift register 131.

The level shifter 135 can output the first-mode gate clocks GCLK_MOD1 to the gate shift register 131 in response to a mode control signal CMOD of a first logic voltage H. The first-mode gate clocks GCLK_MOD1 can be for implementing a normal scan rate mode MODE1. In the first-mode gate clocks GCLK_MOD1, adjacent gate clocks can have a phase difference equal to 1 horizontal period.

The level shifter 135 can output the second-mode gate clocks GCLK_MOD2 to the gate shift register 131 in response to a mode control signal CMOD of a second logic voltage L. The second-mode gate clocks GCLK_MOD2 can be for implementing a high scan rate mode MODE2. In the second-mode gate clocks GCLK_MOD2, adjacent gate clock pairs can have a phase difference equal to 1 horizontal period. Two gate clocks configuring the same gate clock pair can have the same phase.

The level shifter 135 can supply the first-mode gate clocks GCLK_MOD1 to the gate shift register 131 through a plurality of clock lines in the normal scan rate mode MODE1 and can supply the second-mode gate clocks GCLK_MOD2 to the gate shift register 131 through the clock lines in the high scan rate mode MODE2.

The level shifter 135 can further output the start signal VST to the gate shift register 131 through a start line, in each of the normal scan rate mode MODE1 and the high scan rate mode MODE2.

The gate shift register 131 can generate normal scan rate scan signals SCAN synchronized with the first-mode gate clocks GCLK_MOD1 to output to gate lines in the normal scan rate mode MODE1.

The gate shift register 131 can generate high scan rate scan signals SCAN synchronized with the second-mode gate clocks GCLK_MOD2 to output to the gate lines in the high scan rate mode MODE2.

The gate shift register 131 can include a plurality of gate stages STG1 to STG(m/4) dependently connected to one another. To decrease a circuit area occupied by the gate shift register 131, the gate shift register 131 can be designed so that m/4 number of gate stages drive m number of gate lines.

To this end, as in FIG. 5, one stage STG1 according to the present embodiment can include four output nodes OP1 to OP4 and can output four scan signals SCAN1 to SCAN4 through the output nodes OP1 to OP4.

The one stage STG1 according to the present embodiment can include a first scan output circuit PU1 and PD1 connected to a first output node OP1, a second scan output circuit PU2 and PD2 connected to a second output node OP2, a third scan output circuit PU3 and PD3 connected to a third output node OP3, a fourth scan output circuit PU4 and PD4 connected to a fourth output node OP4, and a carry output circuit PU and PD connected to a carry output node OP. The one stage STG1 according to the present embodiment can include a node control circuit NC for controlling operations of the first to fourth scan output circuits and the carry output circuit. A start signal VST, a reset signal RST, a high-level driving voltage GVDD, and a low-level driving voltage GVSS can be supplied to the node control circuit NC. The start signal VST can be replaced with a start carry signal, and the reset signal RST can be replaced with a reset carry signal. The start carry signal can be a carry output of one of previous stages, and the reset carry signal can be a carry output of one of next stages.

The first to fourth scan output circuits and the carry output circuit can share a Q node and a QB node of the node control circuit NC. While a voltage of the Q node is maintained at an active level, a voltage of the QB node can be maintained at an inactive level. On the other hand, while the voltage of the Q node is maintained at an inactive level, the voltage of the QB node can be maintained at an active level.

Gate electrodes of first to fourth pull-up transistors PU1 to PU4 included in the first to fourth scan output circuits can be connected to the Q node in common. While the voltage of the Q node has an active level, first to fourth gate clocks SCLK1 to SCLK4 can be applied to the first to fourth output nodes OP1 to OP4 through the first to fourth pull-up transistors PU1 to PU4. Accordingly, the first to fourth scan signals SCAN1 to SCAN4 output from the first to fourth output nodes OP1 to OP4 can be synchronized with the first to fourth gate clocks SCLK1 to SCLK4.

The first to fourth gate clocks SCLK1 to SCLK4 can be the first-mode gate clocks GCLK_MOD1 in the normal scan rate mode MODE1 and can be the second-mode gate clocks GCLK_MOD2 in the high scan rate mode MODE2.

Gate electrodes of first to fourth pull-down transistors PD1 to PD4 included in the first to fourth scan output circuits can be connected to the QB node in common. While a voltage of the QB node has an active level, the low-level driving voltage GVSS can be applied to the first to fourth output nodes OP1 to OP4 through the first to fourth pull-down transistors PD1 to PD4.

Moreover, while the voltage of the Q node has an active level, the carry clock CRCLK1 can be applied to the carry output node OP through the pull-up transistor PU. Further, while the voltage of the QB node has an active level, the low-level driving voltage GVSS can be applied to the carry output node OP through the pull-down transistor PD. A carry output C1 output from the carry output node OP can be synchronized with the carry clock CRCLK1. The carry output C1 can be input to another stage and can function as a start carry signal or a reset carry signal in the other stage.

Figure 6:
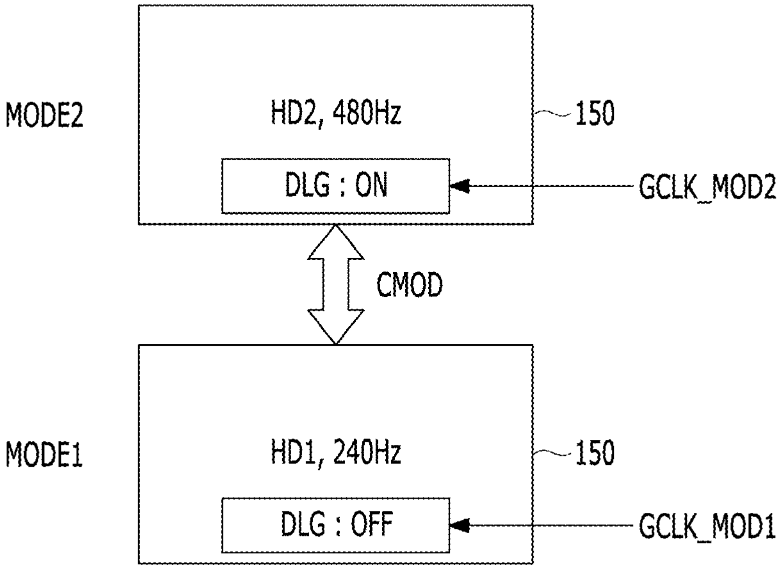
FIG. 6 is a diagram illustrating an example where a screen of a first resolution is implemented in the normal scan rate mode, and a screen of a second resolution is implemented in the high scan rate mode.
Figure 7:
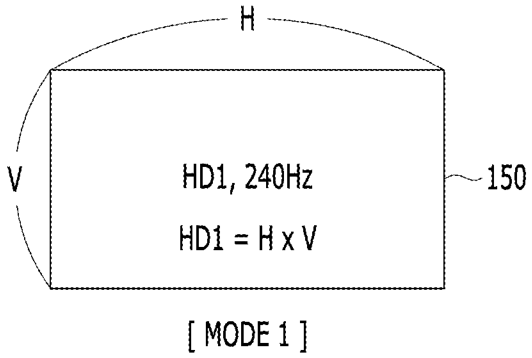
FIGS. 7 to 10 are diagrams for describing an operation of a panel driver for implementing a screen of the first resolution in the normal scan rate mode.
Figure 8:
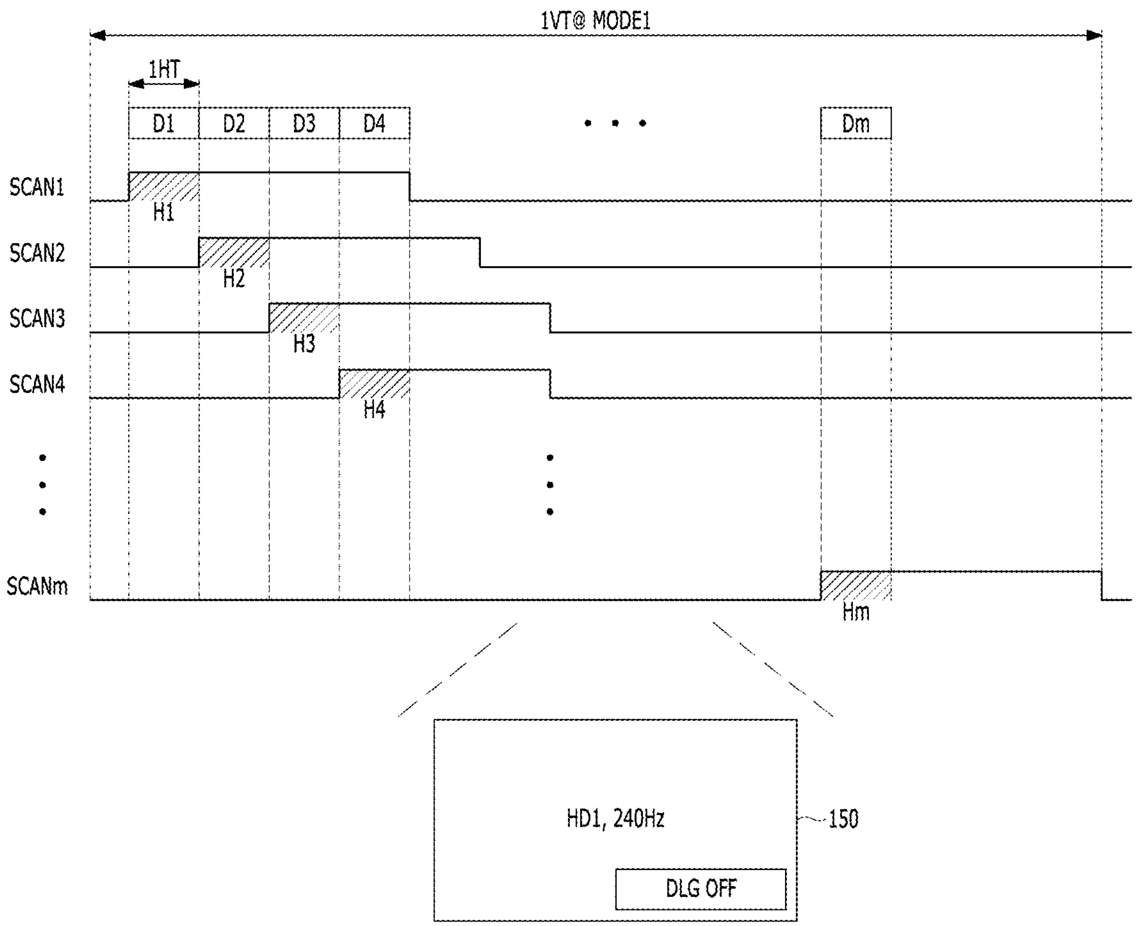
Figure 9:
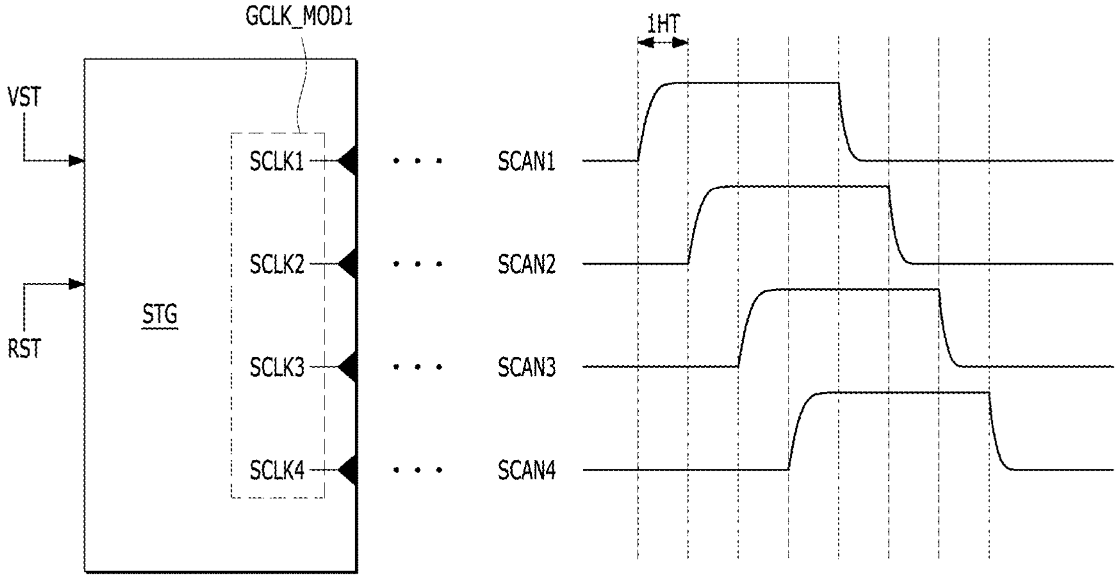

FIG. 6 is a diagram illustrating an example where a screen of a first resolution is implemented in the normal scan rate mode, and a screen of a second resolution is implemented in the high scan rate mode.

Referring to FIG. 6, a screen of a first resolution HD1 can be implemented in a normal scan rate mode MODE1, and a screen of a second resolution HD2 can be implemented in a high scan rate mode MODE2. In the high scan rate mode MODE2, two gate lines configuring the same gate line pair can be simultaneously scanned, and thus, a vertical resolution of a screen can decrease by half compared to the normal scan rate mode.

In the normal scan rate mode MODE1, the screen of the first resolution HD1 can be implemented by normal scan rate scan signals. The normal scan rate scan signals can be synchronized with first-mode gate clocks GCLK_MOD1. "DLG:OFF" can be implemented by the first-mode gate clocks GCLK_MOD1. "DLG:OFF" can denote that a resolution reduction function is deactivated. In the normal scan rate mode MODE1, input image data can be displayed on a screen without omission. A frame frequency of the normal scan rate mode MODE1 can be 240 Hz.

In the high scan rate mode MODE2, the screen of the second resolution HD2 can be implemented by high scan rate scan signals. The high scan rate scan signals can be synchronized with second-mode gate clocks GCLK_MOD2. "DLG:ON" can be implemented by the second-mode gate clocks GCLK_MOD2. "DLG:ON" can denote that a resolution reduction function is activated. In the high scan rate mode MODE2, input image data can be displayed on a screen in a state where a portion of the input image data is omitted. A frame frequency of the high scan rate mode MODE2 can be 480 Hz.

FIGS. 7 to 10 are diagrams for describing an operation of a panel driver for implementing a screen of the first resolution in the normal scan rate mode.

Referring to FIGS. 7 to 10, in a normal scan rate mode MODE1, a gate driver can respectively supply first to $m^{th}$ gate lines with first to $m^{th}$ scan signals SCAN1 to SCANm having a phase difference equal to 1 horizontal period 1HT, so as to implement a screen of a first resolution UH1 (H*V).

In this case, a data driver can synchronize input image data with the first to $m^{th}$ scan signals SCAN1 to SCANm to output to data lines without down-scaling.

For example, the data driver can output a first data voltage D1 during a first horizontal period H1 overlapping the first scan signal SCAN1, output a second data voltage D2 during a second horizontal period H2 overlapping the second scan signal SCAN2, output a third data voltage D3 during a third horizontal period H3 overlapping the third scan signal SCAN3, and output a fourth data voltage D4 during a fourth horizontal period H4 overlapping the fourth scan signal SCAN4. In this manner, the data driver can output an $m^{th}$ data voltage Dm during an $m^{th}$ horizontal period Hm overlapping the $m^{th}$ scan signal SCANm.

Therefore, during one vertical period (one frame period) 1VT, the first to $m^{th}$ data voltages D1 to Dm can be sequentially supplied to all pixel lines of a display panel 150, and thus, the screen of the first resolution HD1 can be finished.

In the normal scan rate mode MODE1, the first to fourth scan signals SCAN1 to SCAN4 can be synchronized with first-mode gate clocks GCLK_MOD1. For example, in one stage, the first-mode gate clocks GCLK_MOD1 can be output to the first to fourth scan signals SCAN1 to SCAN4.

Figure 10:
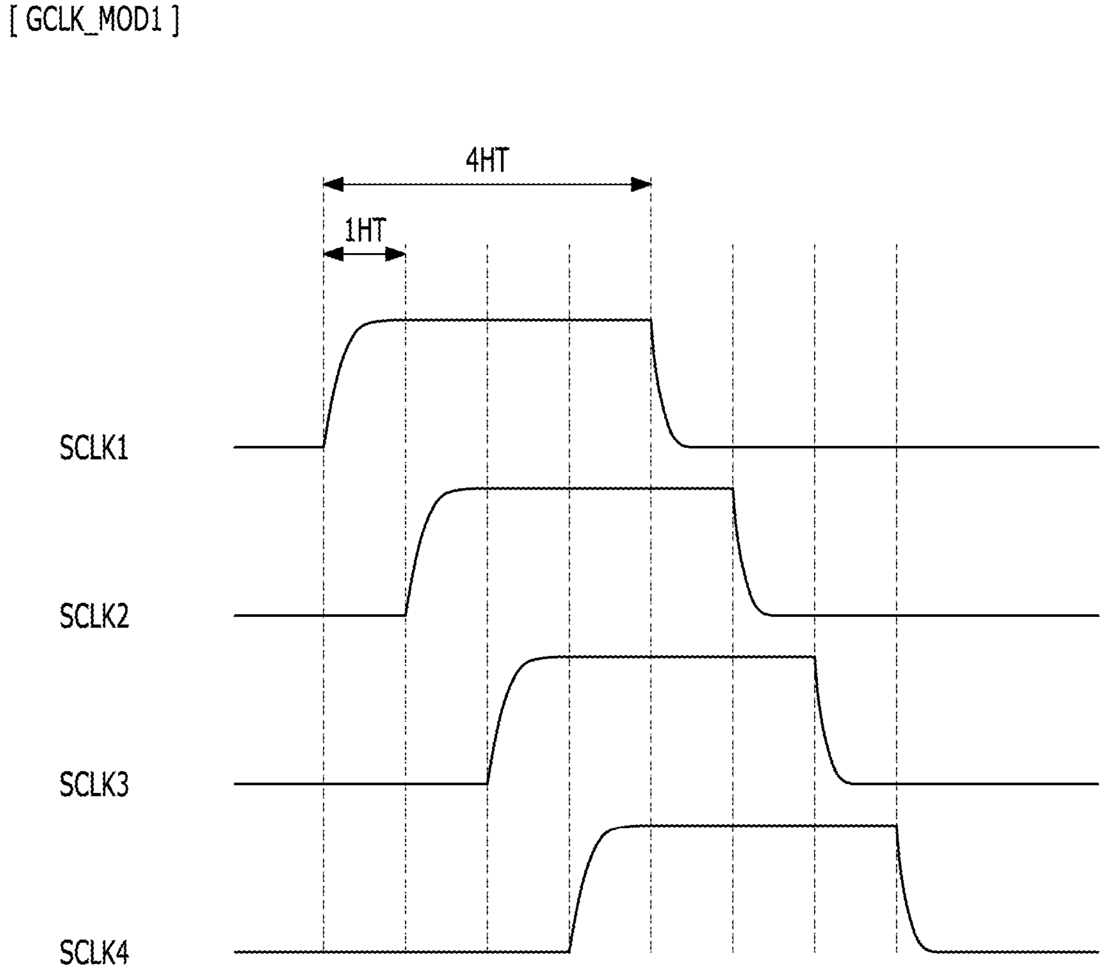

The first-mode gate clocks GCLK_MOD1, as in FIG. 10, can be implemented with the first to fourth gate clocks SCLK1 to SCLK4 having a phase difference equal to 1 horizontal period 1HT between adjacent gate clocks. Each of the first to fourth gate clocks SCLK1 to SCLK4 can have a pulse width equal to four horizontal periods 4HT.

Rising edges of the first-mode gate clocks GCLK_MOD1 can be temporally distributed with a phase difference equal to 1 horizontal period 1HT. Likewise, falling edges of the first-mode gate clocks GCLK_MOD1 can also be temporally distributed with a phase difference equal to 1 horizontal period 1HT.

FIGS. 11 to 14 are diagrams for describing an operation of a panel driver for implementing a screen of the second resolution in the high scan rate mode.

Figure 11:
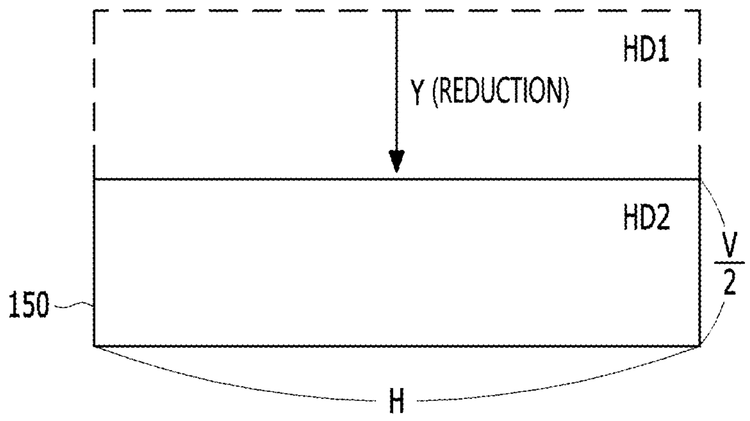
FIGS. 11 to 14 are diagrams for describing an operation of a panel driver for implementing a screen of the second resolution in the high scan rate mode.

Referring to FIG. 11, in order to implement a screen of a second resolution HD2 (H*V/2) in a high scan rate mode MODE2, a gate driver can decrease one vertical period 1VT by half compared to normal, based on second-mode gate clocks GCLK_MOD2, and a data driver can down-scale input image data to decrease a vertical resolution by half compared to normal.

To decrease one vertical period in the high scan rate mode MODE2, gate line pairs each including two gate lines can be configured, the gate line pairs can be sequentially scanned with a phase difference equal to 1 horizontal period 1HT, and two gate lines of the same gate line pairs can be simultaneously scanned. To this end, first and second scan signals SCAN1 and SCAN2 respectively supplied to first and second gate lines can be synchronized with each other, and third and fourth scan signals SCAN3 and SCAN4 respectively supplied to third and fourth gate lines can be synchronized with each other.

Figure 12:
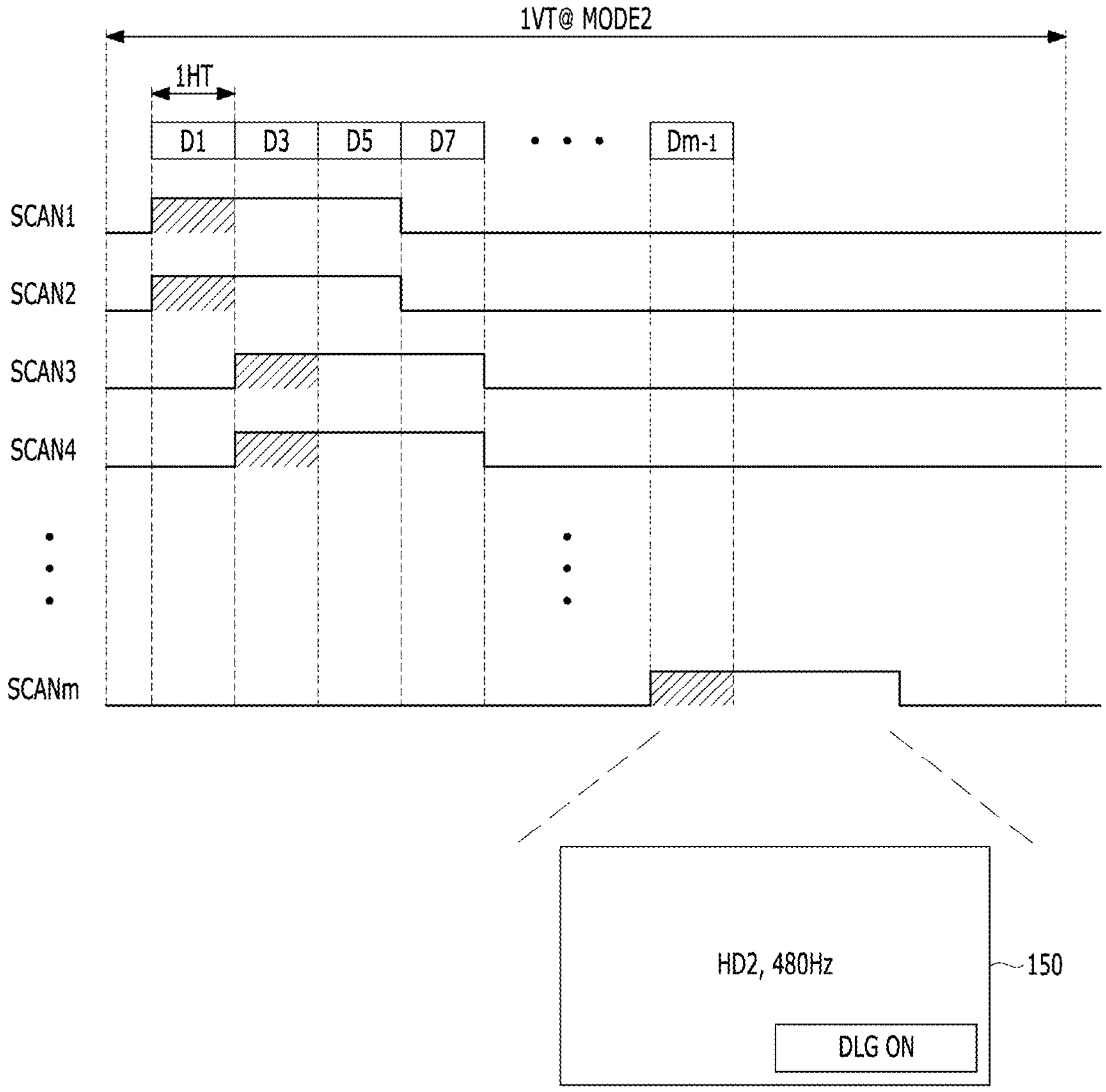

Referring to FIG. 12, in order to implement a screen of a second resolution HD2 (H*V/2) in a high scan rate mode MODE2, a gate driver can respectively supply first to $m^{th}$ gate lines with scan signal pairs having a phase difference equal to 1 horizontal period 1HT.

In this case, a data driver can down-scale input image data to output to data lines in synchronization with the scan signal pairs.

For example, the data driver can output a first data voltage D1 to correspond to first and second scan signals SCAN1 and SCAN2 and can output a second data voltage D3 to correspond to third and fourth scan signals SCAN3 and SCAN4. In this manner, the data driver can output an $m^{th}/2$ data voltage Dm-1 to correspond to $m^{th}-1$ and $m^{th}$ scan signals SCANm−1 and SCANm.

Therefore, during one vertical period 1VT, the first to $m^{th}/2$ data voltages D1, D3, . . . , and Dm-1 can be sequentially supplied to all pixel lines of a display panel 150, and thus, a screen of a second resolution HD2 can be finished.

Figure 13:
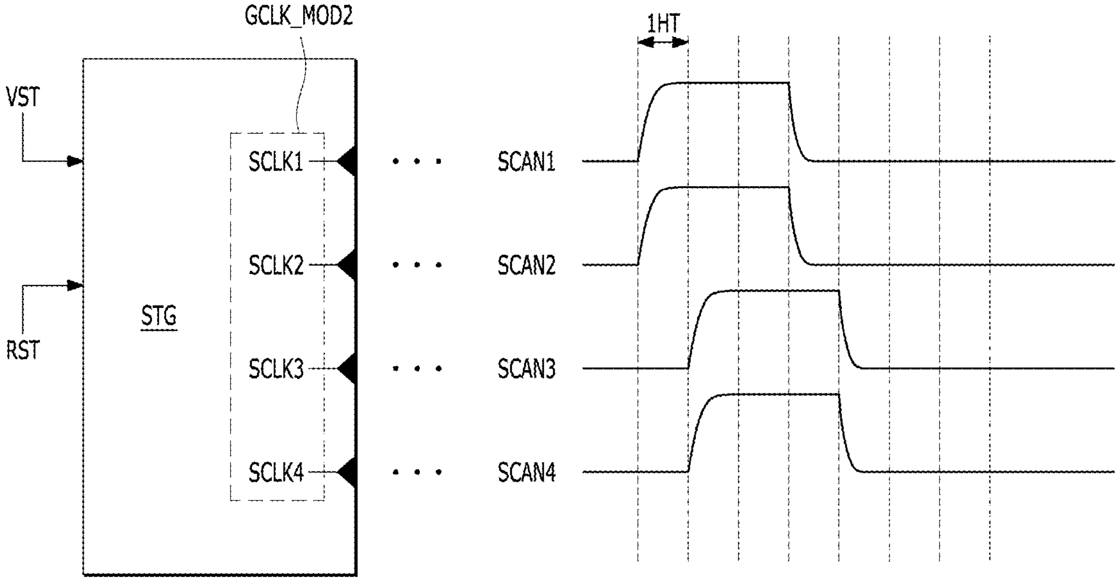
Figure 14:
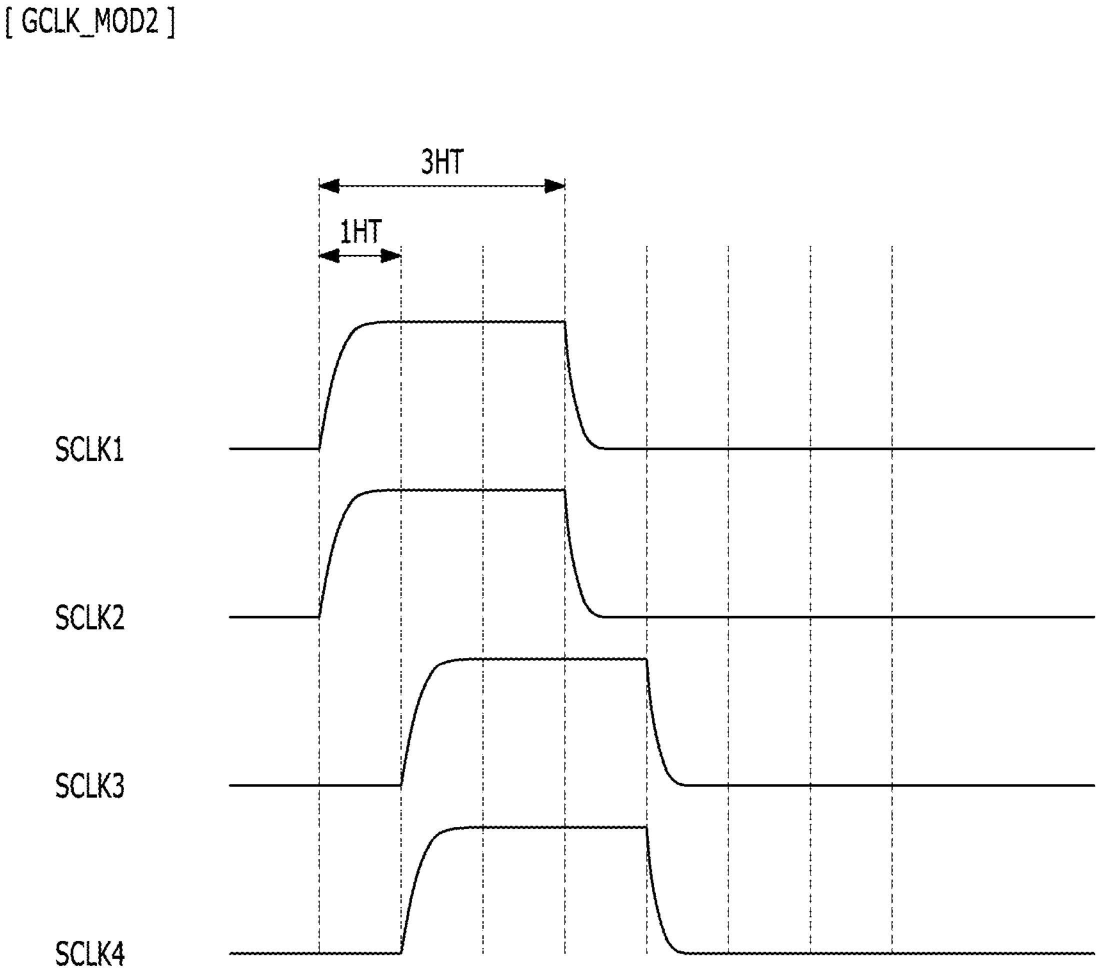

In the high scan rate mode MODE2, the first to fourth scan signals SCAN1 to SCAN4 can be synchronized with second-mode gate clocks GCLK_MOD2 as in FIG. 13. The second-mode gate clocks GCLK_MOD2, as in FIG. 14, can include first and second gate clocks SCLK1 and SCLK2 having the same phase and third and fourth gate clocks SCLK3 and SCLK4 having the same phase. In this case, phases of the third and fourth gate clocks SCLK3 and SCLK4 can be 1 horizontal period 1HT later than phases of the first and second gate clocks SCLK1 and SCLK2. Further, each of the first to fourth gate clocks SCLK1 to SCLK4 can have a pulse width equal to three horizontal periods 3HT.

Figure 15:
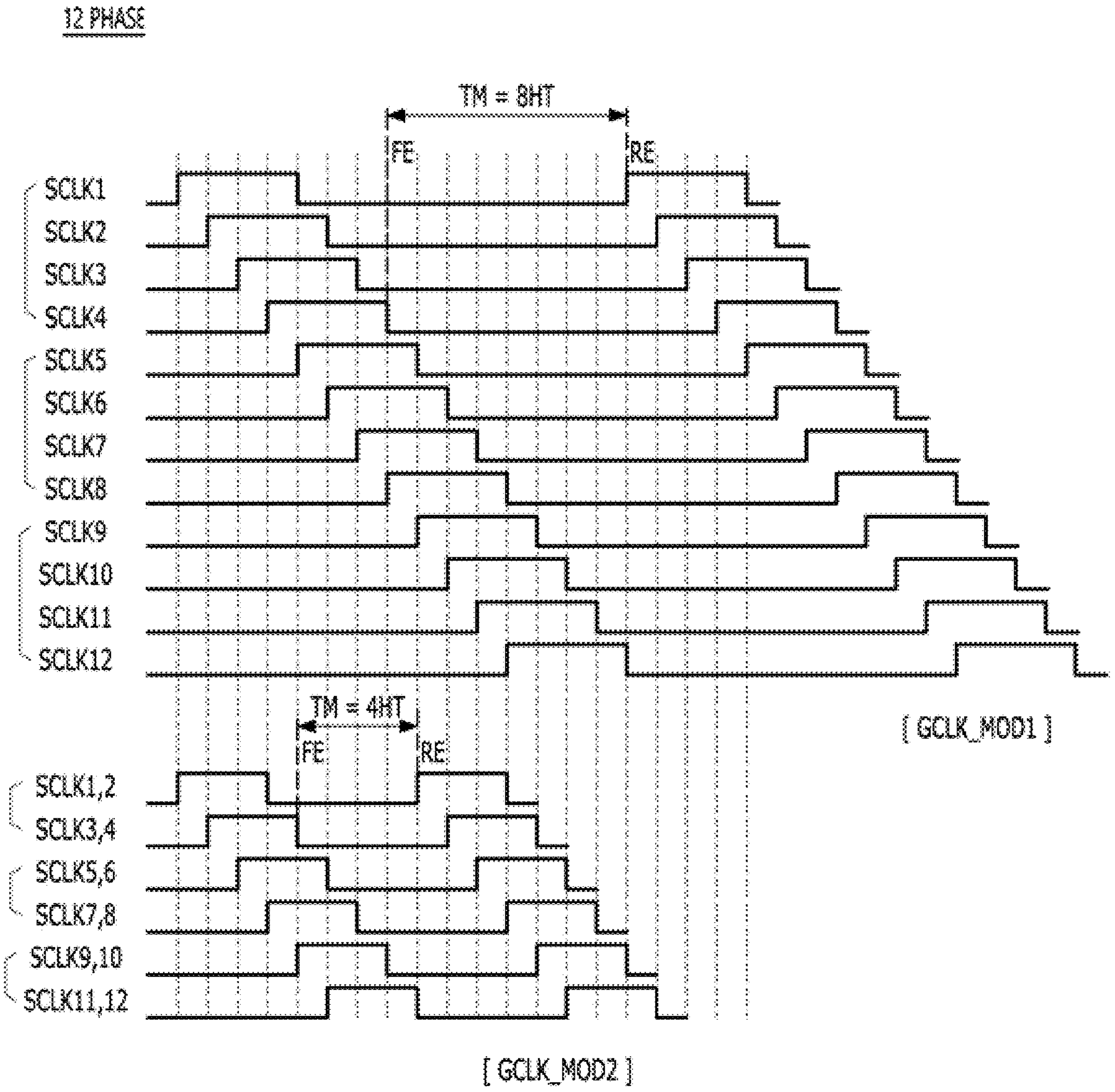
FIG. 15 is a diagram illustrating a comparative example where each of first-mode gate clocks and second-mode gate clocks is implemented as a 12-phase clock.
Figure 16:
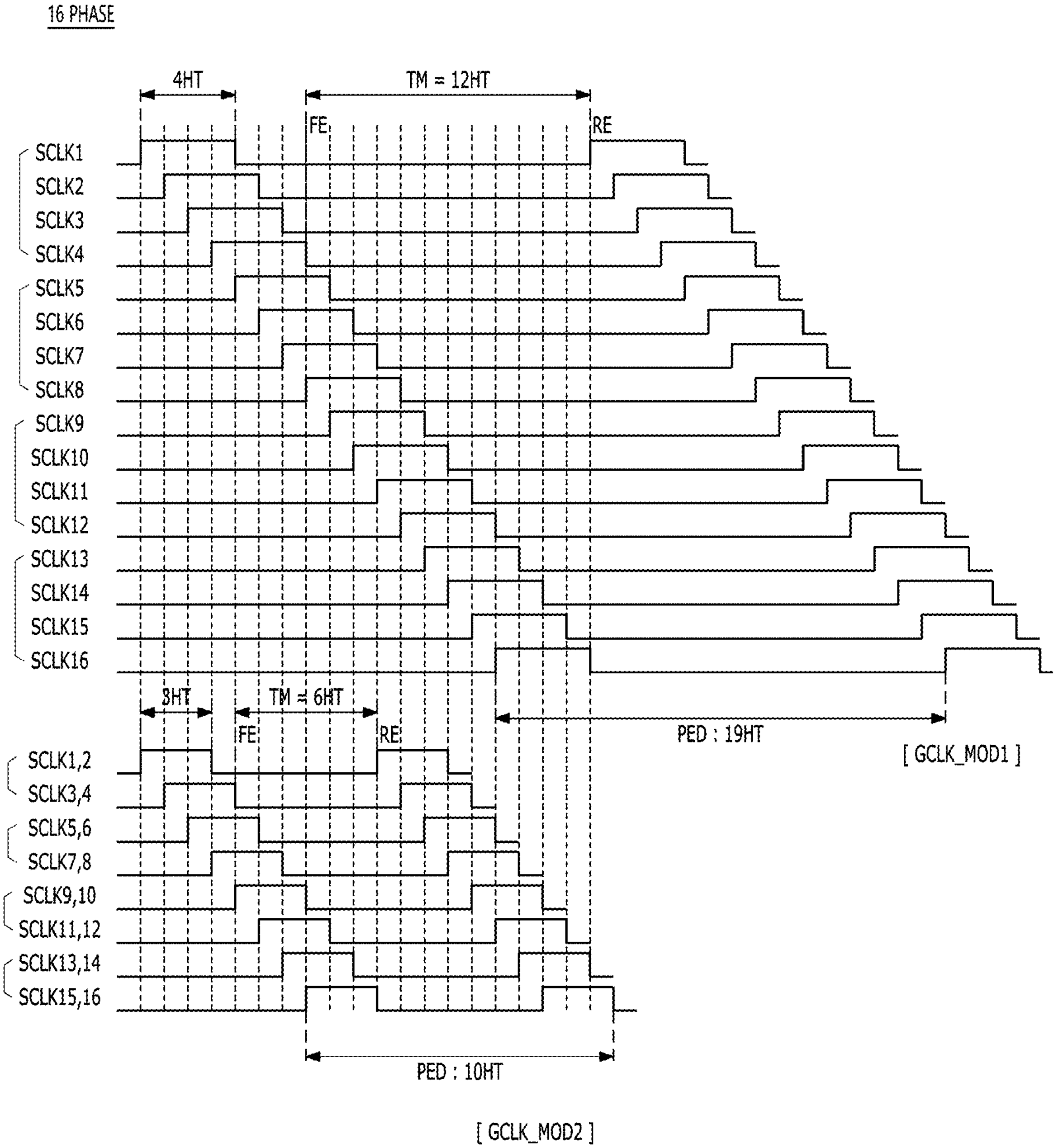
FIG. 16 is a diagram illustrating an embodiment of the present disclosure where each of the first-mode gate clocks and the second-mode gate clocks is implemented as a 16-phase clock.

FIG. 15 is a diagram illustrating a comparative example where each of first-mode gate clocks and second-mode gate clocks is implemented as a 12-phase clock. FIG. 16 is a diagram illustrating an embodiment of the present disclosure where each of the first-mode gate clocks and the second-mode gate clocks is implemented as a 16-phase clock.

Referring to FIG. 15, in a comparative example where each of first-mode gate clocks GCLK_MOD1 and second-mode gate clocks GCLK_MOD2 is implemented as a 12-phase clock, a timing margin TM in the first-mode gate clocks GCLK_MOD1 can be 8 horizontal periods 8HT, and a timing margin TM in the second-mode gate clocks GCLK_MOD2 can be 4 horizontal periods 4HT.

When one stage configuration is implemented as in FIG. 5, a timing margin TM between gate clocks can be determined by units of four gate clocks where phases are adjacent to one another. For example, the timing margin TM between the gate clocks can be determined to be an interval between a falling edge FE of a gate clock SCLK4, having a latest phase, of the four gate clocks and a rising edge RE of a gate clock SCLK1, having an earliest phase, of the four gate clocks.

When the timing margin TM between the gate clocks is not sufficient, the quality of a scan output can be degraded. In a normal scan rate mode MODE1, because the timing margin TM between the gate clocks is 8 horizontal periods 8HT, an issue may not largely occur. However, in a high scan rate mode MODE2, because the timing margin TM between the gate clocks is 4horizontal periods 4HT and is relatively short, a time needed for output discharging can be insufficient, and due to this, a scan output can be distorted.

To solve such a limitation, in the present embodiment of the present disclosure, as in FIG. 16, each of the first-mode gate clocks GCLK_MOD1 and the second-mode gate clocks GCLK_MOD2 can be implemented as a 16-phase clock. As a result, a timing margin TM in the first-mode gate clocks GCLK_MOD1 can increase to 12 horizontal periods 12HT, and a timing margin TM in the second-mode gate clocks GCLK_MOD2 can increase to 6 horizontal periods 6HT.

Figure 17:
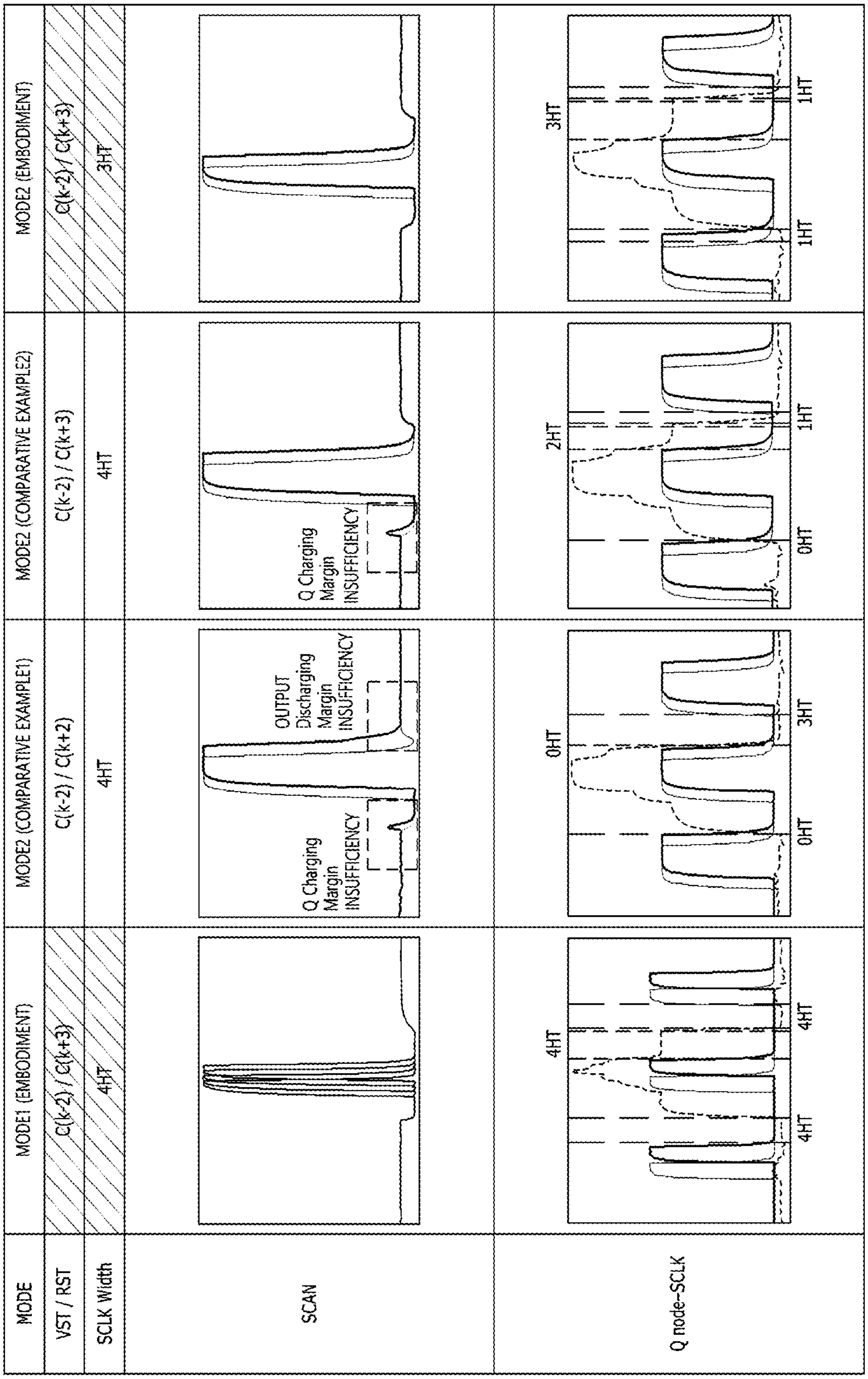
FIG. 17 is a diagram illustrating a differential pulse width configuration of a gate clock and a carry connection configuration for optimizing a driving margin for each scan rate mode.

FIG. 17 is a diagram illustrating a differential pulse width configuration of a gate clock and a carry connection configuration for optimizing a driving margin for each scan rate mode.

According to the present embodiment of FIG. 17, a pulse width of each of first-mode gate clocks GCLK_MOD1 for implementing a normal scan rate mode MODE1 can be 4 horizontal periods 4HT. On the other hand, a pulse width of each of second-mode gate clocks GCLK_MOD2 for implementing a high scan rate mode MODE2 can be 3 horizontal periods 3HT. For example, the pulse width of each of the second-mode gate clocks GCLK_MOD2 can be designed to be narrower than the first mode. Accordingly, a timing margin for Q node charging in a high scan rate mode MODE2 can increase, thereby preventing a degradation in quality of a scan output caused by the insufficiency of a timing margin.

Referring to FIG. 17, a Q node charging margin and an output discharging margin may not be issued in a normal scan rate mode MODE1, but can be issued in the high scan rate mode MODE2 where a timing margin is short.

As in a comparative example 1, when a carry output C(k−2) of a $(k-2)^{th}$ stage is set to a start carry signal, a carry output C(k+2) of a $(k+2)^{th}$ stage is set to a reset carry signal, and the pulse width of each of the second-mode gate clocks GCLK_MOD2 is set to 4 horizontal periods 4HT, all of a Q node charging margin and an output discharging margin can be insufficient.

As in a comparative example 2, when the carry output C(k−2) of the $(k-2)^{th}$ stage is set to the start carry signal, a carry output C(k+3) of a $(k+3)^{th}$ stage is set to the reset carry signal, and the pulse width of each of the second-mode gate clocks GCLK_MOD2 is set to 4 horizontal periods 4HT, the insufficiency of the output discharging margin can be solved, and the insufficiency of the Q node charging margin may not be solved.

Therefore, in the present embodiment, in order to sufficiently secure the Q node charging margin and the output discharging margin, the carry output C(k−2) of the $(k-2)^{th}$ stage can be set to the start carry signal, the carry output C(k+3) of the $(k+3)^{th}$ stage can be set to the reset carry signal, and the pulse width of each of the second-mode gate clocks GCLK_MOD2 can be set to 3horizontal periods 3HT.

In the present embodiment, because the pulse width of each of the second-mode gate clocks GCLK_MOD2 is set to 3 horizontal periods 3HT, each of the Q node charging margin and the output discharging margin in the high scan rate mode MODE2 can secure 1 horizontal period 1HT.

In the present embodiment, because the carry output C(k+3) of the $(k+3)^{th}$ stage is set to the reset carry signal, the output discharging margin in the high scan rate mode MODE2 can further secure 3 horizontal periods 3HT.

Figure 18:
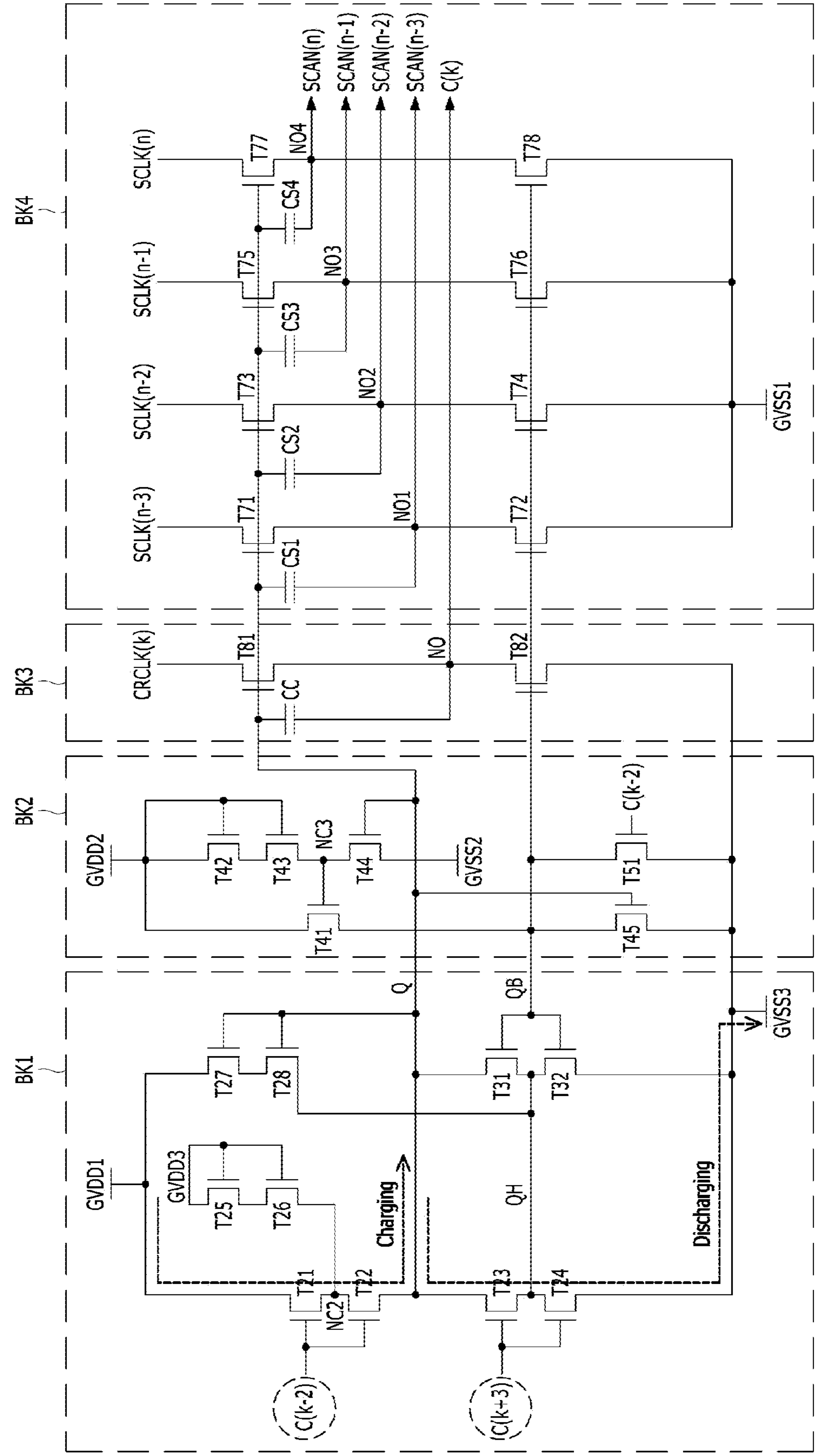
FIG. 18 is a diagram illustrating in detail a configuration of one stage circuit according to the present embodiment of the present disclosure.

FIG. 18 is a diagram illustrating in detail a configuration of one stage circuit according to the present embodiment.

Referring to FIG. 18, a $k^{th}$ stage circuit STG(k) can include a Q node, a QH node, and a QB node. The $k^{th}$ stage circuit STG(k) can include a Q/QH node controller BK1, a QB node controller BK2, a carry output unit BK3, and a scan output unit BK4.

The Q/QH node controller BK1 can charge the Q node with a first high level voltage GVDD1 level in response to an input of a previous carry signal C(k−2) and can discharge the Q node to a third low level voltage GVSS3 level in response to an input of a next carry signal C(k+3). To this end, the Q/QH node controller BK1 can include first to eighth transistors T21 to T28.

The first transistor T21 and the second transistor T22 can be connected between a Q node and a first high level voltage line for transferring the first high level voltage GVDD1. The first transistor T21 and the second transistor T22 can be serially connected to each other. The first transistor T21 and the second transistor T22 can charge the Q node with the first high level voltage GVDD1 level in response to the input of the previous carry signal C(k−2). The first transistor T21 can be turned on based on the input of the previous carry signal C(k−2) and can transfer the first high level voltage GVDD1 to a connection node NC2. The second transistor T22 can be turned on based on the input of the previous carry signal C(k−2) and can electrically connect the connection node NC2 to the Q node. Accordingly, when the first transistor T21 and the second transistor T22 are simultaneously turned on, the first high level voltage GVDD1 can be supplied to the Q node.

The fifth transistor T25 and the sixth transistor T26 can be connected to a third high level voltage line for transferring a third high level voltage GVDD3. The fifth transistor T25 and the sixth transistor T26 can transfer the third high level voltage GVDD3 to the connection node NC2 in response to the third high level voltage GVDD3. The fifth transistor T25 and the sixth transistor T26 can be simultaneously turned on by the third high level voltage GVDD3 and can constantly transfer the third high level voltage GVDD3 to the connection node NC2, and thus, can increase a voltage difference between a gate voltage of the first transistor T21 and the connection node NC2. Therefore, when the first transistor T21 is turned off as the previous carry signal C(k−2) of a carry level is input to a gate of the first transistor T21, the first transistor T21 can be completely maintained in a turn-off state due to the voltage difference between the gate voltage of the first transistor T21 and the connection node NC2. Accordingly, the current leakage of the first transistor T21 and the voltage drop of the Q node caused thereby can be prevented, and thus, a voltage of the Q node can be stably maintained. To this end, the third high level voltage GVDD3 can be set to a voltage level which is lower than the first high level voltage GVDD1.

The third transistor T23 and the fourth transistor T24 can be connected between the Q node and a third low level voltage line for transferring a third low level voltage GVSS3. The third transistor T23 and the fourth transistor T24 can be serially connected to each other. The third transistor T23 and the fourth transistor T24 can discharge the Q node and the QH node to the third low level voltage GVSS3 in response to an input of the next carry signal C(k+3). The fourth transistor T24 can be turned on based on the input of the next carry signal C(k+3) and can discharge the QH node to a second low level voltage GVSS2 level. The third transistor T23 can be turned on based on the input of the next carry signal C(k+3) and can electrically connect the Q node to the QH node. Accordingly, when the third transistor T23 and the fourth transistor T24 are simultaneously turned on, each of the Q node to the QH node can be discharged to the third low level voltage GVSS3 level.

The seventh transistor T27 and the eighth transistor T28 can be connected between the Q node and a first high level voltage line for transferring a first high level voltage GVDD1 and between the QH node and the first high level voltage line for transferring the first high level voltage GVDD1. The seventh transistor T27 and the eighth transistor T28 can be serially connected to each other. The seventh transistor T27 and the eighth transistor T28 can transfer the first high level voltage GVDD1 to the QH node in response to a voltage of the Q node. When the voltage of the Q node has an on level, the seventh transistor T27 can be turned on and can transfer the first high level voltage GVDD1 to a share node of the seventh transistor T27 and the eighth transistor T28. When the voltage of the Q node has an on level, the eighth transistor T28 can be turned on and can electrically connect the share node to the QH node. Therefore, when the voltage of the Q node has an on level, the seventh transistor T27 and the eighth transistor T28 can be simultaneously turned on and can transfer the first high level voltage GVDD1 to the QH node. When the first high level voltage GVDD1 is supplied to the QH node, a voltage difference between a gate of the third transistor T23 and the QH node can increase. Therefore, when the third transistor T23 is turned off as the next carry signal C(k+3) of an off level is input to the gate of the third transistor T23, the third transistor T23 can be completely maintained in a turn-off state due to the voltage difference between the gate voltage of the third transistor T23 and the QH node. Accordingly, the current leakage of the third transistor T23 and the voltage drop of the Q node caused thereby can be prevented, and thus, the voltage of the Q node can be stably maintained.

The Q/QH node controller BK1 can discharge the Q node and the QH node to the third low level voltage GVSS3 in response to a voltage of the QB node. To this end, the Q/QH node controller BK1 can further include a first additional transistor T31 and a second additional transistor T32. The first additional transistor T31 and the second additional transistor T32 can be connected between the Q node and the third low level voltage line for transferring the third low level voltage GVSS3. The first additional transistor T31 and the second additional transistor T32 can be serially connected to each other. The first additional transistor T31 and the second additional transistor T32 can discharge the Q node and the QH node to the third low level voltage GVSS3 level in response to a voltage of the QH node. When the voltage of the QB node has an on level, the second additional transistor T32 can be turned on and can transfer the third low level voltage GVSS3 to a share node of the first additional transistor T31 and the second additional transistor T32. When the voltage of the QB node has an on level, the first additional transistor T31 can be turned on and can electrically connect the Q node to the QH node. Accordingly, when the first additional transistor T31 and the second additional transistor T32 are simultaneously turned on in response to the voltage of the QB node, each of the Q node and the QH node can be discharged to the third low level voltage GVSS3 level.

The QB node controller BK2 can shift a voltage level of the Q node to a voltage level of the QB node. To this end, the QB node controller BK2 can include first to fifth transistors T41 to T45.

The second transistor T42 and the third transistor T43 can be connected between a third connection node NC3 and a second high level voltage line for transferring a second high level voltage GVDD2. The second transistor T42 and the third transistor T43 can be serially connected to each other. The second transistor T42 and the third transistor T43 can transfer the second high level voltage GVDD2 to the connection node NC3 in response to the second high level voltage GVDD2. The second transistor T42 can be turned on by the second high level voltage GVDD2 and can transfer the second high level voltage GVDD2 to a share node of the second transistor T42 and the third transistor T43. The third transistor T43 can be turned on by the second high level voltage GVDD2 and can electrically connect the connection node NC3 to the share node of the second transistor T42 and the third transistor T43. Therefore, when the second transistor T42 and the third transistor T43 are simultaneously turned on by the second high level voltage GVDD2, the connection node NC3 can be charged with the second high level voltage GVDD2 level. The fourth transistor T44 can be connected between the connection node NC3 and a second low level voltage line for transferring the second low level voltage GVSS2. The fourth transistor T44 can transfer the second low level voltage GVSS2 to the connection node NC3 in response to the voltage of the Q node. When the voltage of the Q node has an on level, the fourth transistor T44 can discharge or reset the connection node NC3 to the second low level voltage GVSS2.

The first transistor T41 can be connected between the QB node and the second high level voltage line for transferring the second high level voltage GVDD2. The first transistor T41 can transfer the second high level voltage GVDD2 to the QB node in response to the voltage of the connection node NC3. When the voltage of the connection node NC3 has an on level, the first transistor T41 can charge the QB node with the second high level voltage GVDD2 level. The fifth transistor T45 can be connected between the QB node and the third low level voltage line for transferring the third low level voltage GVSS3. The fifth transistor T45 can transfer the third low level voltage GVSS3 to the QB node in response to the voltage of the Q node. When the voltage of the Q node has an on level, the fifth transistor T45 can charge the QB node with the third low level voltage GVSS3 level.

The QB node controller BK2 can discharge the QB node to the third low level voltage GVSS3 level in response to the input of the next carry signal C(k−2). To this end, the QB node controller BK2 can further include a first additional transistor T51.

The first additional transistor T51 can be connected between the QB node and the third low level voltage line for transferring the third low level voltage GVSS3. The first additional transistor T51 can transfer the third low level voltage GVSS3 to the QB node in response to the input of the next carry signal C (k−2).

The carry output unit BK3 can output a carry clock CRCLK(k) of a gate on voltage as a carry signal C(k) of an on voltage while the Q node is being charged with an on voltage level and can output the third low level voltage GVSS3 as the carry signal C(k) of an on voltage while the QB node is being charged with an on voltage level.

The carry output unit BK3 can include a first transistor T81, a second transistor T82, and a boosting capacitor CC. The first transistor T81 can be connected between an output node NO and a clock signal line of the carry clock CRCLK (k). The boosting capacitor CC can be connected between a gate and a source of the first transistor T81. When the carry clock CRCLK(k) of a gate on voltage is output to the output node NO, the boosting capacitor CC can bootstrap the voltage of the Q node up to a boosting voltage level which is higher than the first high level voltage GVDD1 level, in synchronization with the carry clock CRCLK(k) of a gate on voltage. When the voltage of the Q node is bootstrapped, the carry signal C(k) of an on voltage can be quickly charged into the output node NO without distortion. Therefore, the carry signal C(k) of an on voltage can be output from the output node NO. The second transistor T82 can transfer the third low level voltage GVSS3 to the output node NO in response to the voltage of the QB node. Accordingly, the carry signal C(k) of an off voltage can be output from the output node NO.

The scan output unit BK4 can output first to fourth gate clocks SCLK(n−3) to SCLK(n) of a gate on voltage as first to fourth scan signals SCAN(n−3) to SCAN(n) of an on voltage while the Q node is being charged with an on voltage level and can output the first low level voltage GVSS1 as the first to fourth scan signals SCAN(n−3) to SCAN(n) of an off voltage while the QB node is being charged with an on voltage level. To this end, the scan output unit BK4 can include first to eighth transistors T71 to T78 and first to fourth boosting capacitors CS1 to CS4.

The first transistor T71 can be connected between a clock signal line of the first gate clock SCLK(n−3) and a first output node NO1. The first boosting capacitor CS1 can be connected between a gate and a source of the first transistor T71. When the first gate clock SCLK(n−3) of a gate on voltage is output to the first output node NO1, the first boosting capacitor CS1 can bootstrap the voltage of the Q node up to the boosting voltage level which is higher than the first high level voltage GVDD1 level, in synchronization with the first gate clock SCLK(n−3) of a gate on voltage. When the voltage of the Q node is bootstrapped, the first scan signal SCAN (n−3) of an on voltage can be quickly charged into the first output node NO1 without distortion. Therefore, the first scan signal SCAN(n−3) of an on voltage can be output from the first output node NO1. The second transistor T72 can transfer the first low level voltage GVSS1 to the first output node NO1 in response to the voltage of the QB node. Accordingly, the first scan signal SCAN(n−3) of an off voltage can be output from the first output node NO1.

The third transistor T73 can be connected between a clock signal line of the second gate clock SCLK(n−2) and a second output node NO2. The second boosting capacitor CS2 can be connected between a gate and a source of the third transistor T73. When the second gate clock SCLK(n−2) of a gate on voltage is output to the second output node NO2, the second boosting capacitor CS2 can bootstrap the voltage of the Q node up to the boosting voltage level which is higher than the first high level voltage GVDD1 level, in synchronization with the second gate clock SCLK(n−2) of a gate on voltage. When the voltage of the Q node is bootstrapped, the second scan signal SCAN(n−2) of an on voltage can be quickly charged into the second output node NO2 without distortion. Therefore, the second scan signal SCAN(n−2) of an on voltage can be output from the second output node NO2. The fourth transistor T74 can transfer the first low level voltage GVSS1 to the second output node NO2 in response to the voltage of the QB node. Accordingly, the second scan signal SCAN(n−2) of an off voltage can be output from the second output node NO2.

The fifth transistor T75 can be connected between a clock signal line of the third gate clock SCLK(n−1) and a third output node NO3. The third boosting capacitor CS3 can be connected between a gate and a source of the fifth transistor T75. When the third gate clock SCLK(n−1) of a gate on voltage is output to the third output node NO3, the third boosting capacitor CS3 can bootstrap the voltage of the Q node up to the boosting voltage level which is higher than the first high level voltage GVDD1 level, in synchronization with the third gate clock SCLK(n−1) of a gate on voltage. When the voltage of the Q node is bootstrapped, the third scan signal SCAN(n−1) of an on voltage can be quickly charged into the third output node NO3 without distortion. Therefore, the third scan signal SCAN(n−1) of an on voltage can be output from the third output node NO3. The sixth transistor T76 can transfer the first low level voltage GVSS1 to the third output node NO3 in response to the voltage of the QB node. Accordingly, the third scan signal SCAN(n−1) of an off voltage can be output from the third output node NO3.

The seventh transistor T77 can be connected between a clock signal line of the fourth gate clock SCLK(n) and a fourth output node NO4. The seventh boosting capacitor CS4 can be connected between a gate and a source of the seventh transistor T77. When the fourth gate clock SCLK(n) of a gate on voltage is output to the fourth output node NO4, the fourth boosting capacitor CS4 can bootstrap the voltage of the Q node up to the boosting voltage level which is higher than the first high level voltage GVDD1 level, in synchronization with the fourth gate clock SCLK(n) of a gate on voltage. When the voltage of the Q node is bootstrapped, the fourth scan signal SCAN(n) of an on voltage can be quickly charged into the fourth output node NO4 without distortion. Therefore, the fourth scan signal SCAN (n) of an on voltage can be output from the fourth output node NO4. The eighth transistor T78 can transfer the first low level voltage GVSS1 to the fourth output node NO4 in response to the voltage of the QB node. Accordingly, the fourth scan signal SCAN(n) of an off voltage can be output from the fourth output node NO4.

In the present embodiment, in order to stabilize voltages of the Q node, the QB node, and the QH node by minimizing an off current flowing in transistors having an off state, a high-level voltage and a low-level voltage can be set to three (or two) different voltage levels.

For example, the first high level voltage GVDD1 can be set to 20 V, the second high level voltage GVDD2 can be set to 16 V, the third high level voltage GVDD3 can be set to 14 V, the first low level voltage GVSS1 can be set to −6 V, the second low level voltage GVSS2 can be set to −10 V, and the third low level voltage GVSS3 can be set to −12 V. As another example, the first low level voltage GVSS1 and the second low level voltage GVSS2 can be set to the same voltage (for example, −6 V). Such a numerical value can be merely an embodiment, and levels of a high-level voltage and a low-level voltage can be differently set according to embodiments.

Figure 19:
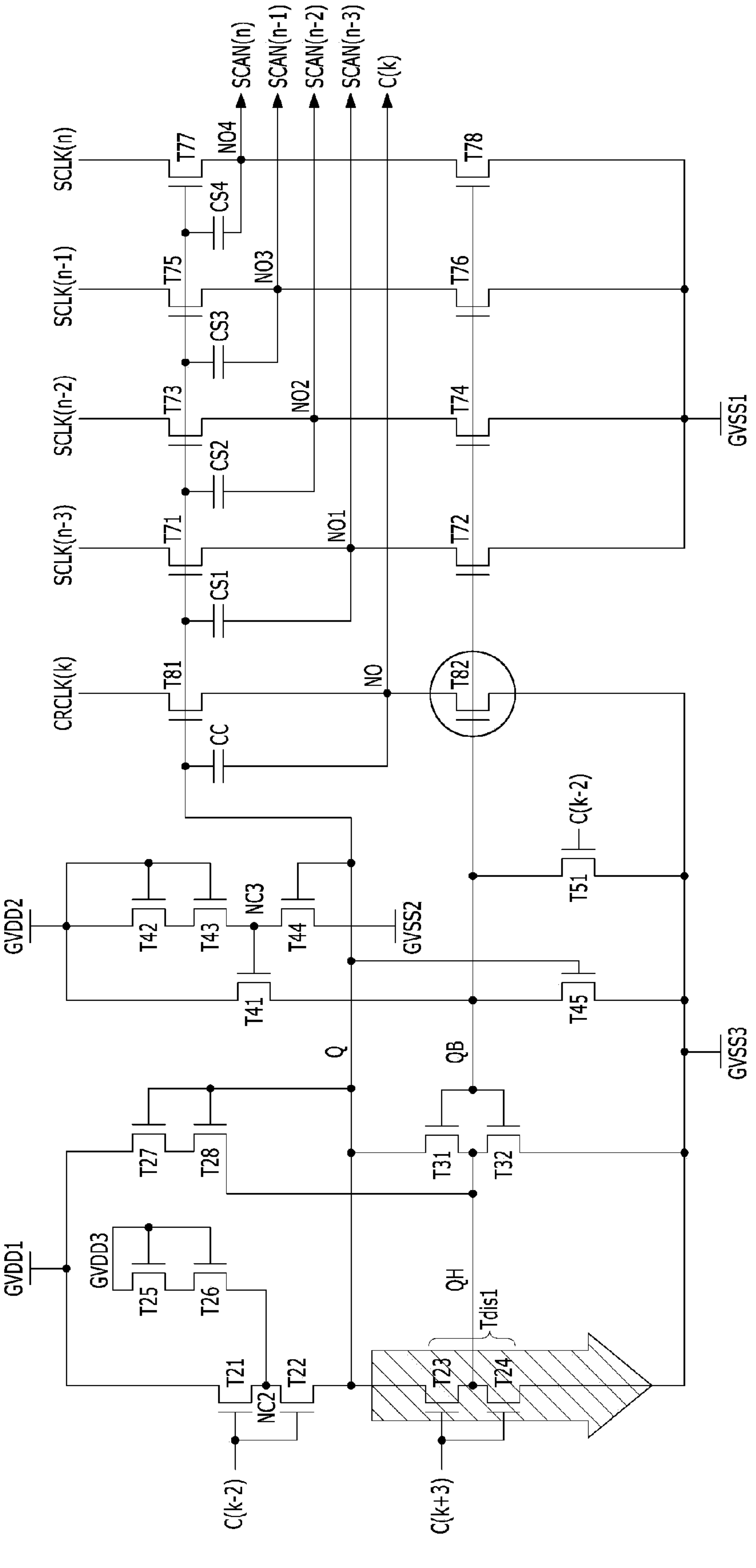
FIGS. 19 and 20 are diagrams illustrating a configuration modification of a stage circuit for enhancing a discharging characteristic of a Q node and an effect based thereon.
Figure 20:
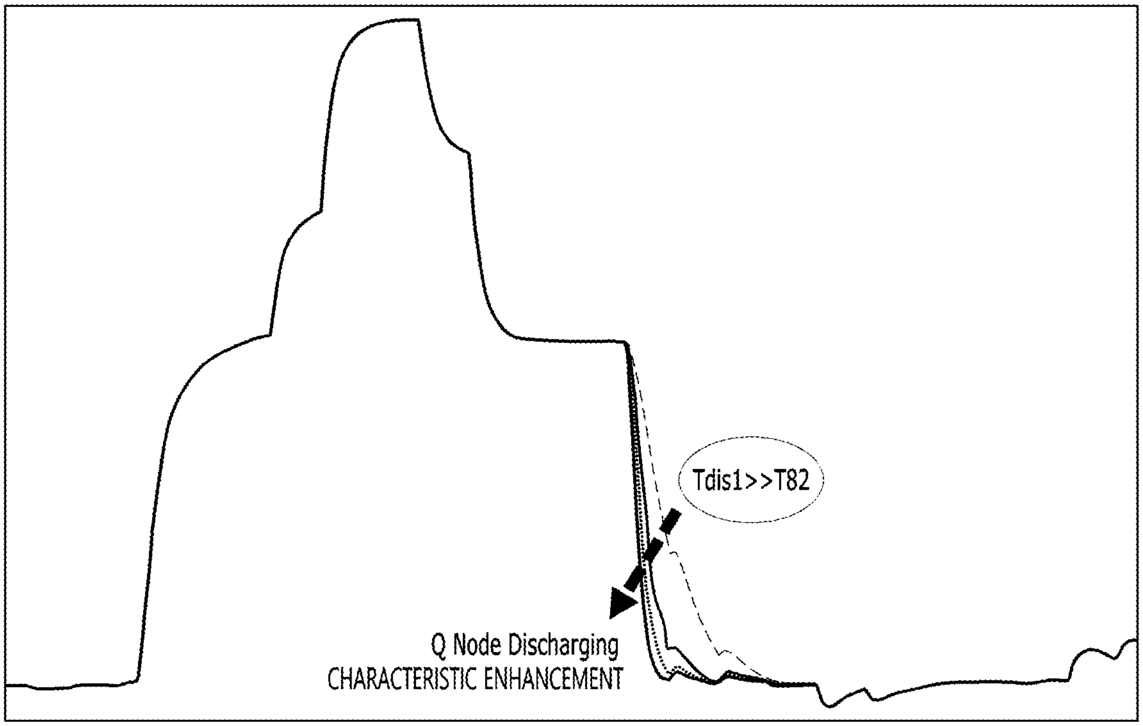

FIGS. 19 and 20 are diagrams illustrating a configuration modification of a stage circuit for enhancing a discharging characteristic of a Q node and an effect based thereon.

Referring to FIG. 19, a third transistor T23 and a fourth transistor T24 can be serially connected to each other to configure a first discharging transistor Tdis1. The first discharging transistor Tdis1 can discharge a Q node in response to a carry output C(k+3) of a (k+3)$^{th}$ stage.

Referring to FIG. 20, it can be needed that a capacity of the first discharging transistor Tdis1 is two or more times greater than a capacity of a pull-down transistor T82 of a carry output circuit, so as to enhance a discharging characteristic of the Q node. A capacity of the first discharging transistor Tdis1 can be designed to have a maximum size within a range of an allowable design area.

When a discharging characteristic of the Q node is enhanced, a timing margin can be easily secured for an assigned time.

Figure 21:
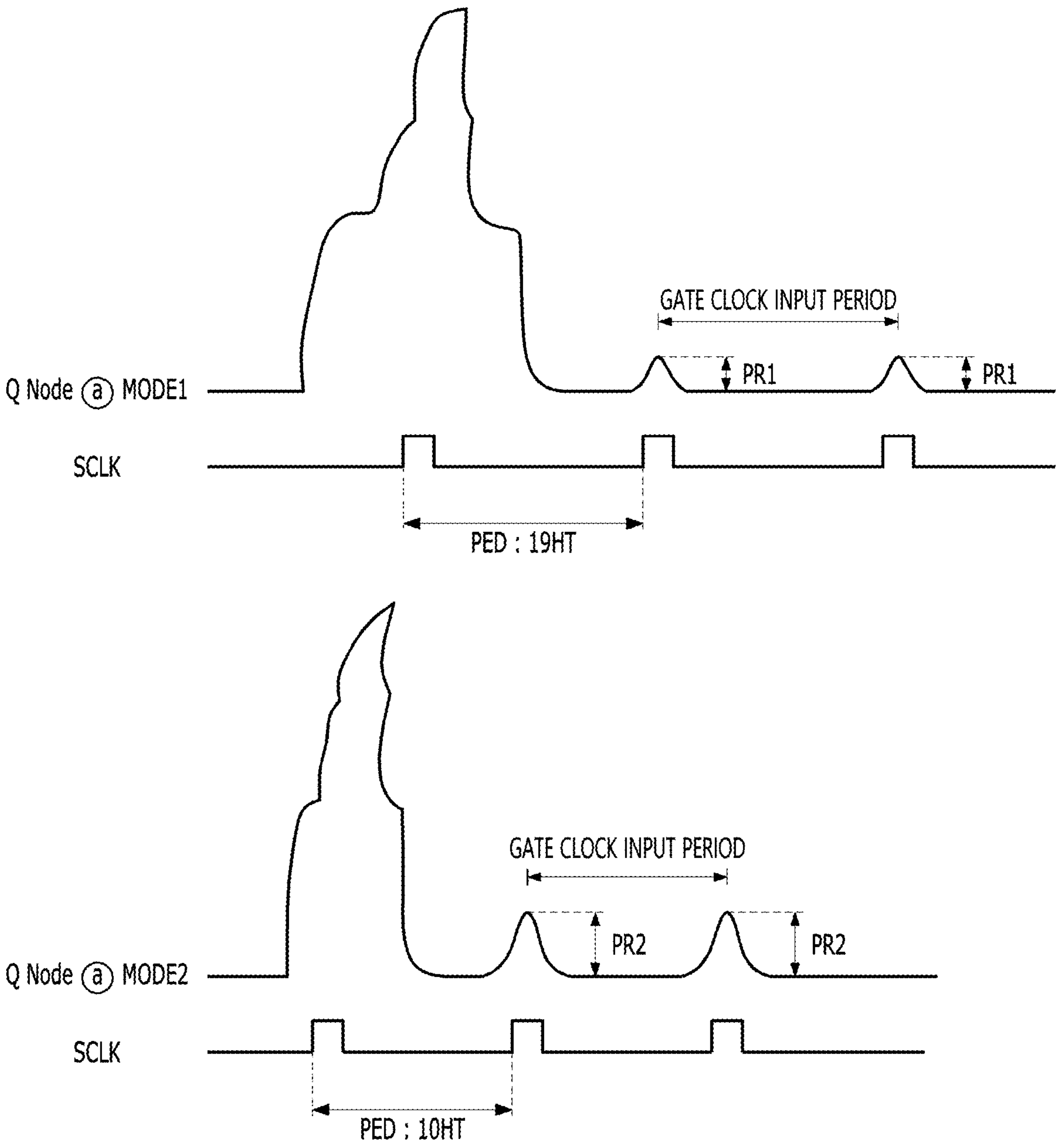
FIG. 21 is a diagram illustrating a Q node ripple occurring based on an input period of a gate clock, in the normal scan rate mode and the high scan rate mode.

FIG. 21 is a diagram illustrating a Q node ripple occurring based on an input period of a gate clock, in the normal scan rate mode and the high scan rate mode.

Referring to FIGS. 16 and 21, each of first-mode gate clocks GCLK_MOD1 in a normal scan rate mode MODE1 can be repeated at a period PED of 19 horizontal periods 19HT, and each of second-mode gate clocks GCLK_MOD2 in a high scan rate mode MODE2 can be repeated at a period PED of 10 horizontal periods 10HT.

Therefore, a Q node of each stage can be affected by ripple according to a repeated period 19HT of a first-mode gate clock SCLK in the normal scan rate mode MODE1 and can be affected by ripple according to a repeated period 10HT of a second-mode gate clock SCLK in the high scan rate mode MODE2.

A magnitude of ripple occurring in the Q node in the normal scan rate mode MODE1 can be PR1, and a magnitude of ripple occurring in the Q node in the high scan rate mode MODE2 can be PR2 which is greater than PR1. This can be because a gate clock pair having the same phase affects the Q node in the high scan rate mode MODE2 unlike the normal scan rate mode MODE1.

Figure 22:
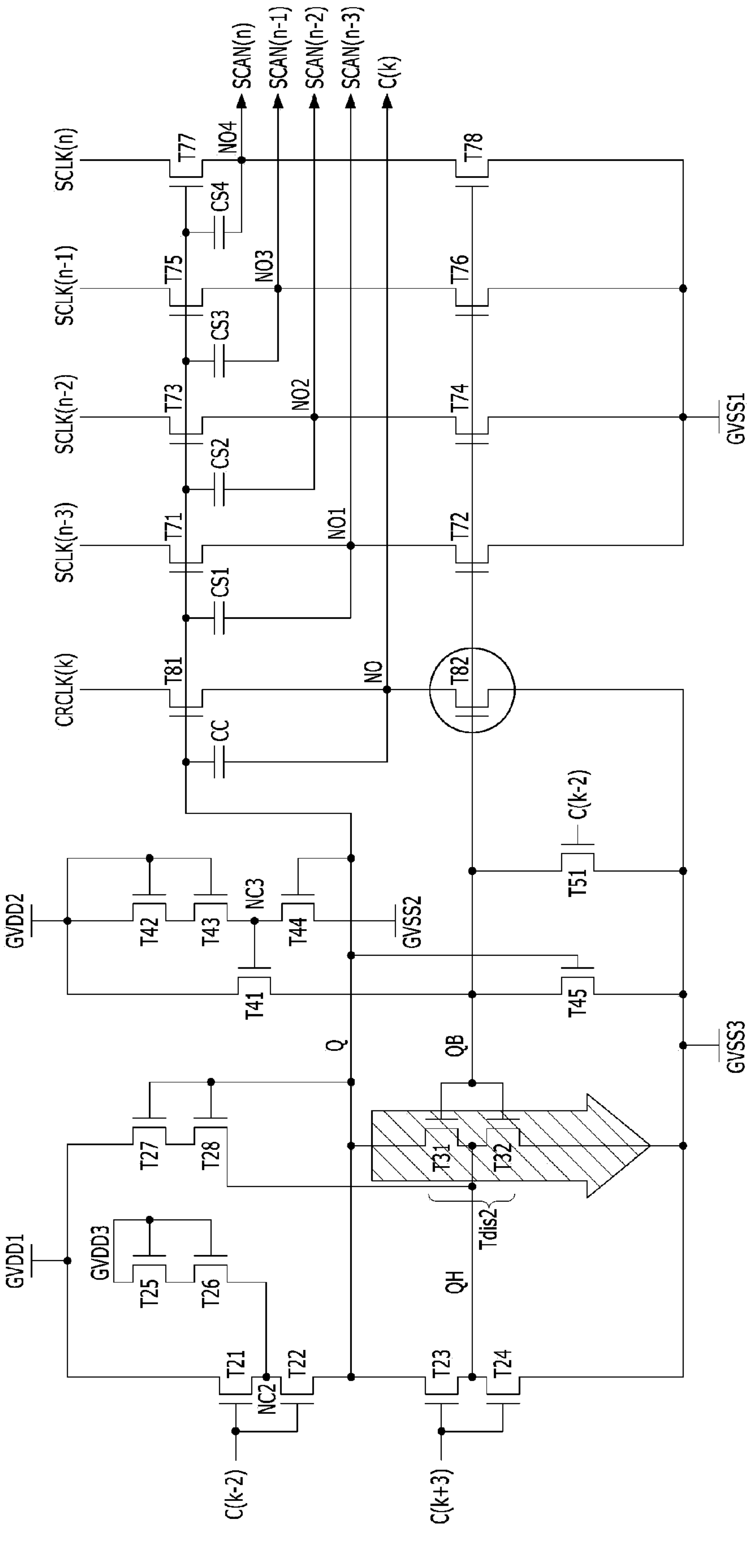
FIGS. 22 and 23 are diagrams illustrating a configuration modification of a stage circuit for decreasing a Q node ripple and an effect based thereon.
Figure 23:
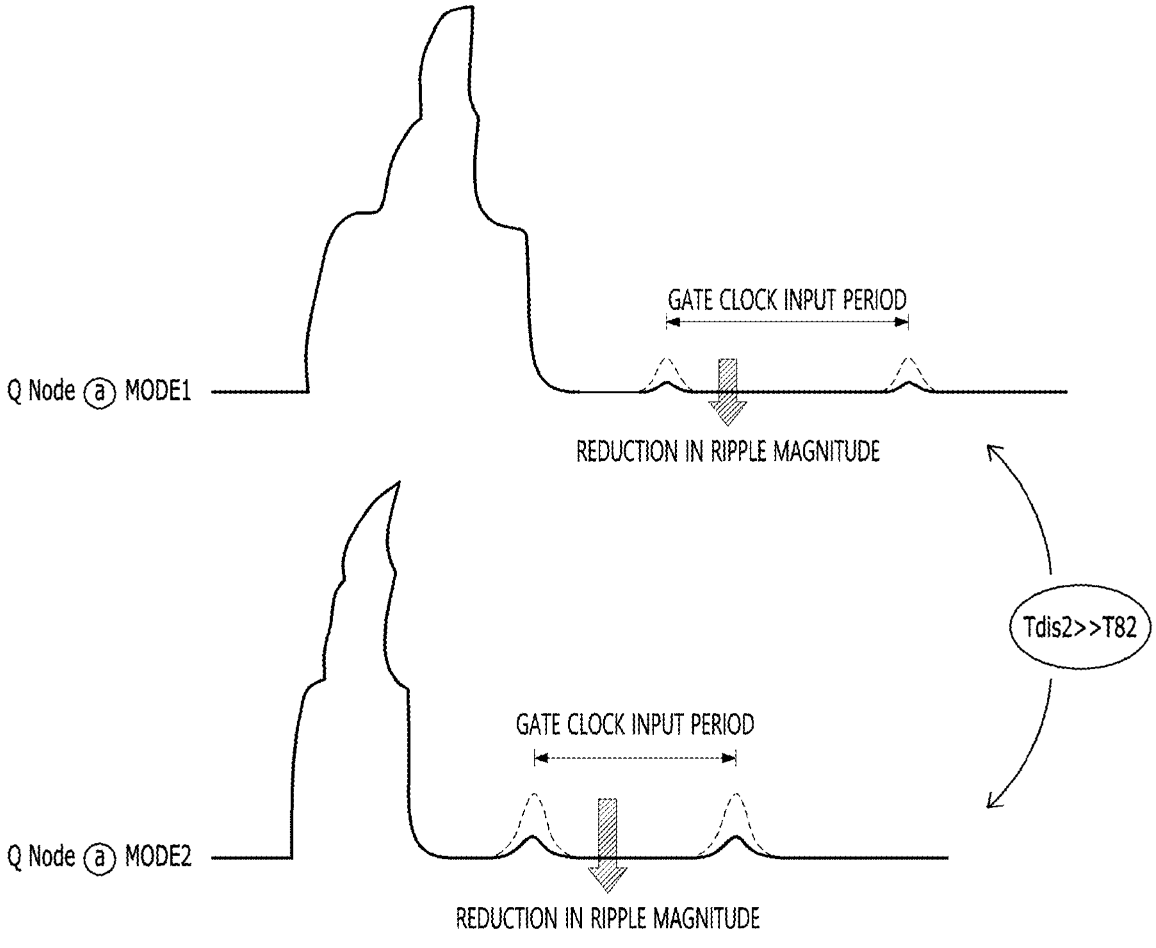

FIGS. 22 and 23 are diagrams illustrating a configuration modification of a stage circuit for decreasing a Q node ripple and an effect based thereon.

Referring to FIG. 22, a first additional transistor T31 and a second additional transistor T32 can be serially connected to each other to configure a second discharging transistor Tdis2. The second discharging transistor Tdis2 can be turned on in response to a voltage of a QB node and can thus maintain a Q node in a discharging state.

Referring to FIG. 23, it can be needed that a capacity of the second discharging transistor Tdis2 is two or more times greater than a capacity of a pull-down transistor T82 of a carry output circuit, so as to enhance a discharging characteristic of the Q node. A capacity of the second discharging transistor Tdis2 can be designed to have a maximum size within a range of an allowable design area.

When a discharging characteristic of the Q node is enhanced, a magnitude of ripple occurring in the Q node in each of the normal scan rate mode MODE1 and the high scan rate mode MODE2 can be reduced.

Figure 24:
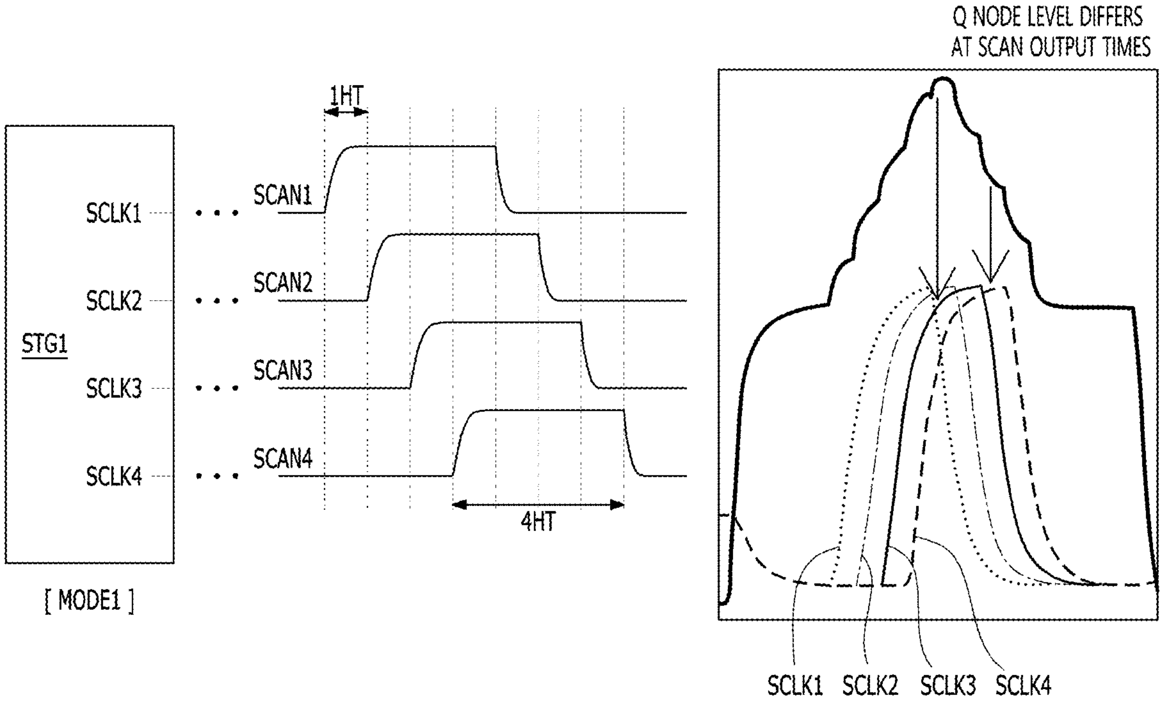
FIGS. 24 and 25 are diagrams illustrating an example where a voltage level of a Q node differs at scan output times, in the normal scan rate mode and the high scan rate mode.
Figure 25:
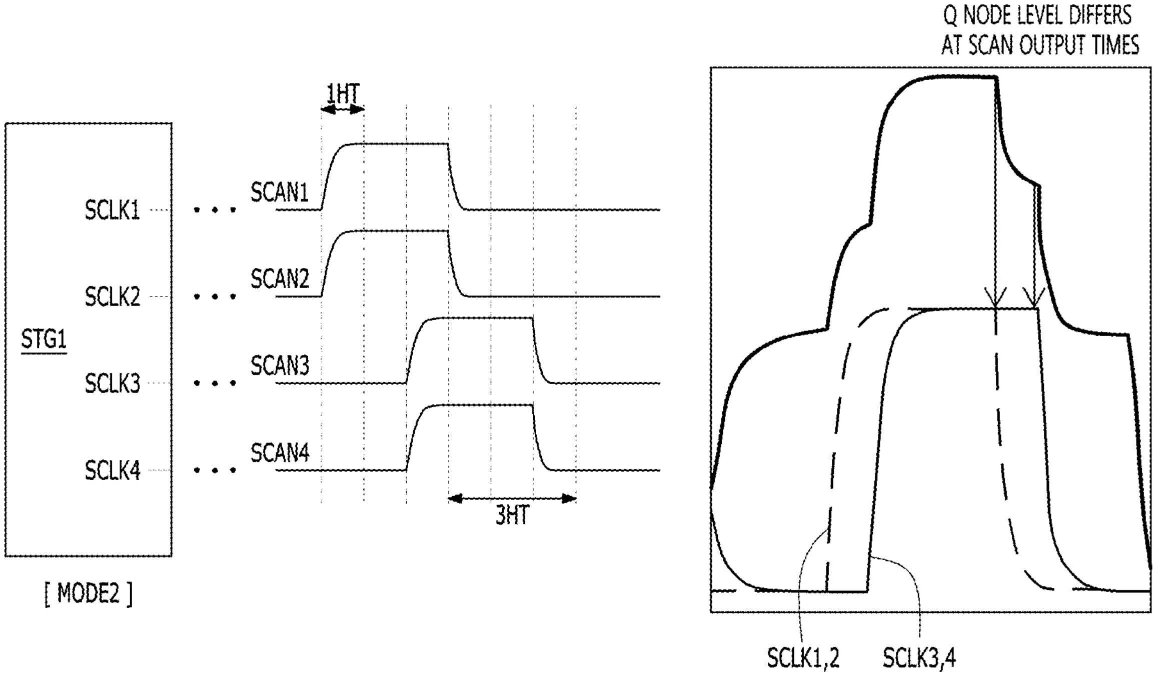

FIGS. 24 and 25 are diagrams illustrating an example where a voltage level of a Q node differs at scan output times, in the normal scan rate mode and the high scan rate mode.

Referring to FIG. 24, a voltage level of a Q node can differ at falling edges of first to fourth gate clocks SCLK1 to SCLK4 in a normal scan rate mode MODE1. Accordingly, a deviation between output characteristics of first to fourth scan signals SCAN1 to SCAN4 can occur.

Referring to FIG. 25, a voltage level of a Q node can differ at falling edges of first to fourth gate clocks SCLK1 to SCLK4 in a high scan rate mode MODE1. Accordingly, a deviation between output characteristics of first to fourth scan signals SCAN1 to SCAN4 can occur.

Figure 26:
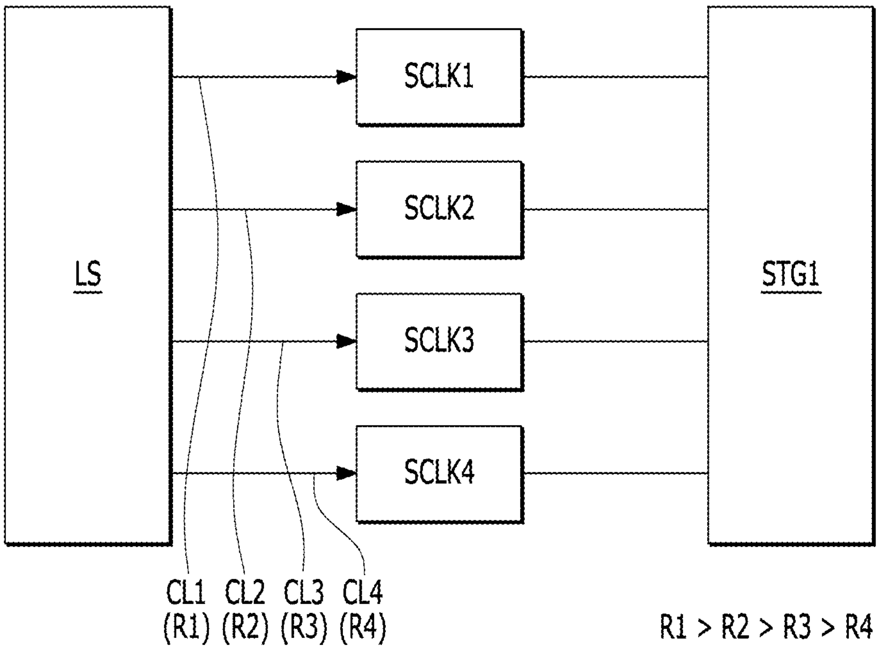
FIG. 26 is a diagram illustrating an example where a line resistance is differently designed for each clock line so as to compensate for an output characteristic deviation which occurs because a voltage level of a Q node differs at scan output times.

FIG. 26 is a diagram illustrating an example where a line resistance is differently designed for each clock line so as to compensate for an output characteristic deviation which occurs because a voltage level of a Q node differs at scan output times.

Referring to FIGS. 16 and 26, a level shifter according to the present embodiment can supply first-mode gate clocks GCLK_MOD1 to a gate shift register through sixteen clock lines CL in a normal scan rate mode MODE1 and can supply second-mode gate clocks GCLK_MOD2 to the gate shift register through the sixteen clock lines CL in a high scan rate mode MODE2.

Here, the sixteen clock lines CL can be grouped by units of four clock lines corresponding to four gate clocks. For example, first to fourth clock lines CL1 to CLA of the sixteen clock lines CL can configure the same group and can transfer first to fourth gate clocks SCLK1 to SCLK4. In this case, the first to fourth clock lines CL1 to CL4 can be designed to have different line resistances. For example, when the line resistances of the first to fourth clock lines CL1 to CLA are R1, R2, R3, and R4, a relationship thereof can be R1>R2>R3>R4.

Moreover, preferably, it can be designed that a resistance of a first clock line of four clock lines CL1 to CL4 included in the same group is greater than that of a second clock line. Here, a gate clock having a relatively earlier phase among four gate clocks can be supplied to the first clock line, and a gate clock having a relatively later phase among the four gate clocks can be supplied to the second clock line.

The present embodiments of the disclosure can implement all of the normal scan rate mode and the high scan rate mode while maintaining a mount area equal to the normal scan rate mode.

The present embodiments of the disclosure can optimize an input constant of a gate clock, optimize a connection between a start carry signal and a reset carry signal, and optimize a pulse width of the gate clock for each scan rate mode, and thus, can sufficiently secure a timing margin (or a driving margin) in the normal scan rate mode and the high scan rate mode.

The effects according to the present disclosure are not limited to the above examples, and other various effects can be included in the disclosure.

While the present disclosure has been particularly shown and described with reference to example embodiments thereof, it will be understood by those of ordinary skill in the art that various changes in form and details can be made therein without departing from the spirit and scope of the present disclosure as defined by the following claims.

What is claimed is:

1. A gate driver comprising:

a level shifter configured to output first-mode gate clocks in a normal scan rate mode, and output second-mode gate clocks in a high scan rate mode; and a gate shift register configured to output normal scan rate scan signals synchronized with the first-mode gate clocks in the normal scan rate mode, and output high scan rate scan signals synchronized with the second-mode gate clocks in the high scan rate mode, wherein adjacent gate clocks of the first-mode gate clocks have a phase difference equal to 1 horizontal period, wherein adjacent gate clock pairs of the second-mode gate clocks have a phase difference equal to 1 horizontal period, and two gate clocks of a same gate clock pair are synchronized with each other to have a same phase to simultaneously scan two gate lines, wherein the first-mode gate clocks are implemented as a 16-phase clock and the second-mode gate clocks are implemented as a 16-phase clock, wherein the gate shift register comprises a plurality of stages connected to one another, wherein each of the plurality of stages comprises:

a node control circuit configured to control a Q node and a QB node; and four scan output circuits and one carry output circuit configured to share the Q node and the QB node, and wherein a node control circuit of a kth stage of the plurality of stages comprises:

a charging transistor configured to charge the Q node in response to a carry output of a (k−2)th stage, where k is a natural number; and a first discharging transistor configured to discharge the Q node in response to a carry output of a (k+3)th stage.

2. The gate driver of claim 1, wherein each of the first-mode gate clocks has a pulse width equal to 4 horizontal periods, and wherein each of the second-mode gate clocks has a pulse width equal to 3 horizontal periods.

3. The gate driver of claim 1, wherein the carry output circuit comprises a pull-down transistor including a gate electrode connected to the QB node, and wherein a capacity of the first discharging transistor is two times greater than a capacity of the pull-down transistor of the carry output circuit.

4. The gate driver of claim 1, wherein the node control circuit comprises a second discharging transistor configured to discharge the Q node in response to a voltage of the QB node, wherein the carry output circuit comprises a pull-down transistor including a gate electrode connected to the QB node, and wherein a capacity of the second discharging transistor is two times greater than a capacity of the pull-down transistor of the carry output circuit.

5. The gate driver of claim 1, wherein the level shifter supplies the first-mode gate clocks to the gate shift register through sixteen clock lines in the normal scan rate mode, and supplies the second-mode gate clocks to the gate shift register through the sixteen clock lines in the high scan rate mode, wherein the sixteen clock lines are grouped by units of four clock lines corresponding to four gate clocks, and wherein a resistance of a first clock line of four clock lines included in a same group is greater than a resistance of a second clock line.

6. The gate driver of claim 5, wherein a gate clock having a relatively earlier phase among the four gate clocks is supplied to the first clock line, and wherein a gate clock having a relatively later phase among the four gate clocks is supplied to the second clock line.

7. A display device comprising:

a display panel including a plurality of pixels, a plurality of gate lines connected to the plurality of pixels, and a plurality of data lines connected to the plurality of pixels;

a gate driver configured to drive the plurality of gate lines; and a data driver configured to drive the plurality of data lines, wherein the gate driver comprises:

a level shifter configured to output first-mode gate clocks in a normal scan rate mode, and output second-mode gate clocks in a high scan rate mode; and a gate shift register configured to output normal scan rate scan signals synchronized with the first-mode gate clocks in the normal scan rate mode, and output high scan rate scan signals synchronized with the second-mode gate clocks in the high scan rate mode, wherein adjacent gate clocks of the first-mode gate clocks have a phase difference equal to 1 horizontal period, wherein adjacent gate clock pairs of the second-mode gate clocks have a phase difference equal to 1 horizontal period and two gate clocks of a same gate clock pair are synchronized with each other to have a same phase to simultaneously scan two gate lines, wherein the first-mode gate clocks are implemented as a 16-phase clock and the second-mode gate clocks are implemented as a 16-phase clock, wherein the gate shift register comprises a plurality of stages connected to one another, wherein each of the plurality of stages comprises:

a node control circuit configured to control a Q node and a QB node; and four scan output circuits and one carry output circuit configured to share the Q node and the QB node, wherein a node control circuit of a kth stage of the plurality of stages comprises:

a charging transistor configured to charge the Q node in response to a carry output of a (k−2)th stage, where k is a natural number; and a first discharging transistor configured to discharge the Q node in response to a carry output of a (k+3)th stage.

8. The display device of claim 7, wherein each of the first-mode gate clocks has a pulse width equal to 4 horizontal periods, and wherein each of the second-mode gate clocks has a pulse width equal to 3 horizontal periods.

9. The display device of claim 7, wherein the carry output circuit comprises a pull-down transistor including a gate electrode connected to the QB node, and wherein a capacity of the first discharging transistor is two times greater than a capacity of the pull-down transistor of the carry output circuit.

10. The display device of claim 7, wherein the node control circuit comprises a second discharging transistor configured to discharge the Q node in response to a voltage of the QB node, wherein the carry output circuit comprises a pull-down transistor including a gate electrode connected to the QB node, and wherein a capacity of the second discharging transistor is two times greater than a capacity of the pull-down transistor of the carry output circuit.

11. The display device of claim 7, wherein the level shifter supplies the first-mode gate clocks to the gate shift register through sixteen clock lines in the normal scan rate mode, and supplies the second-mode gate clocks to the gate shift register through the sixteen clock lines in the high scan rate mode, wherein the sixteen clock lines are grouped by units of four clock lines corresponding to four gate clocks, and wherein a resistance of a first clock line of four clock lines included in a same group is greater than a resistance of a second clock line.

12. The display device of claim 11, wherein a gate clock having a relatively earlier phase among the four gate clocks is supplied to the first clock line, and wherein a gate clock having a relatively later phase among the four gate clocks is supplied to the second clock line.

* * * * *